(12) United States Patent
Uchida et al.

(10) Patent No.: US 12,114,282 B2
(45) Date of Patent: Oct. 8, 2024

(54) ELECTRONIC APPARATUS, ELECTRONIC SYSTEM, AND METHOD

(71) Applicant: KABUSHIKI KAISHA TOSHIBA, Tokyo (JP)

(72) Inventors: Daisuke Uchida, Kawasaki Kanagawa (JP); Takafumi Sakamoto, Tokyo (JP); Koji Akita, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 283 days.

(21) Appl. No.: 17/689,520

(22) Filed: Mar. 8, 2022

(65) Prior Publication Data
US 2023/0045297 A1 Feb. 9, 2023

(30) Foreign Application Priority Data

Jul. 29, 2021 (JP) .................................. 2021-123930

(51) Int. Cl.
*H04W 64/00* (2009.01)
*H04B 17/318* (2015.01)
*H04B 17/391* (2015.01)

(52) U.S. Cl.
CPC .......... *H04W 64/00* (2013.01); *H04B 17/318* (2015.01); *H04B 17/391* (2015.01)

(58) Field of Classification Search
CPC .. H04W 64/00; H04W 64/006; H04B 17/318; H04B 17/391; H04B 17/27
See application file for complete search history.

(56) References Cited

U.S. PATENT DOCUMENTS

| | | | |
|---|---|---|---|
| 10,182,306 B2 | 1/2019 | Kanayama et al. | |
| 2017/0195847 A1* | 7/2017 | Reed | H04W 64/006 |
| 2019/0104493 A1* | 4/2019 | Hedley | H04W 4/027 |
| 2020/0379080 A1 | 12/2020 | Sakai | |
| 2021/0190927 A1 | 6/2021 | Sakamoto et al. | |
| 2021/0194423 A1 | 6/2021 | Yonezawa et al. | |
| 2021/0409908 A1 | 12/2021 | Yonezawa et al. | |
| 2022/0011397 A1 | 1/2022 | Sakamoto et al. | |
| 2022/0200711 A1 | 6/2022 | Uchida et al. | |
| 2022/0322276 A1* | 10/2022 | Karlgaard | H04W 64/003 |

FOREIGN PATENT DOCUMENTS

| | | |
|---|---|---|
| JP | 2020094837 A | 6/2020 |
| JP | WO2019107388 | 11/2020 |
| JP | 2022098802 A | 7/2022 |
| WO | 2019107388 A1 | 6/2019 |

OTHER PUBLICATIONS

U.S. Appl. No. 17/689,583, First Named Inventor: Daisuke Uchida; Title: "Electronic Apparatus, Electronic System, and Method"; filed Mar. 8, 2022.

* cited by examiner

*Primary Examiner* — Fred A Casca

(74) *Attorney, Agent, or Firm* — Holtz, Holtz & Volek PC

(57) ABSTRACT

According to one embodiment, an electronic apparatus includes a processor configured to estimate positions where wireless devices communicating each other are located from position candidates based on position candidate information indicating the position candidates of the wireless devices and from first communication information in communication using a first propagation path between the wireless devices to N-th communication information in communication using a N-th propagation path (N: an integer of 2 or more) between the wireless devices.

13 Claims, 21 Drawing Sheets

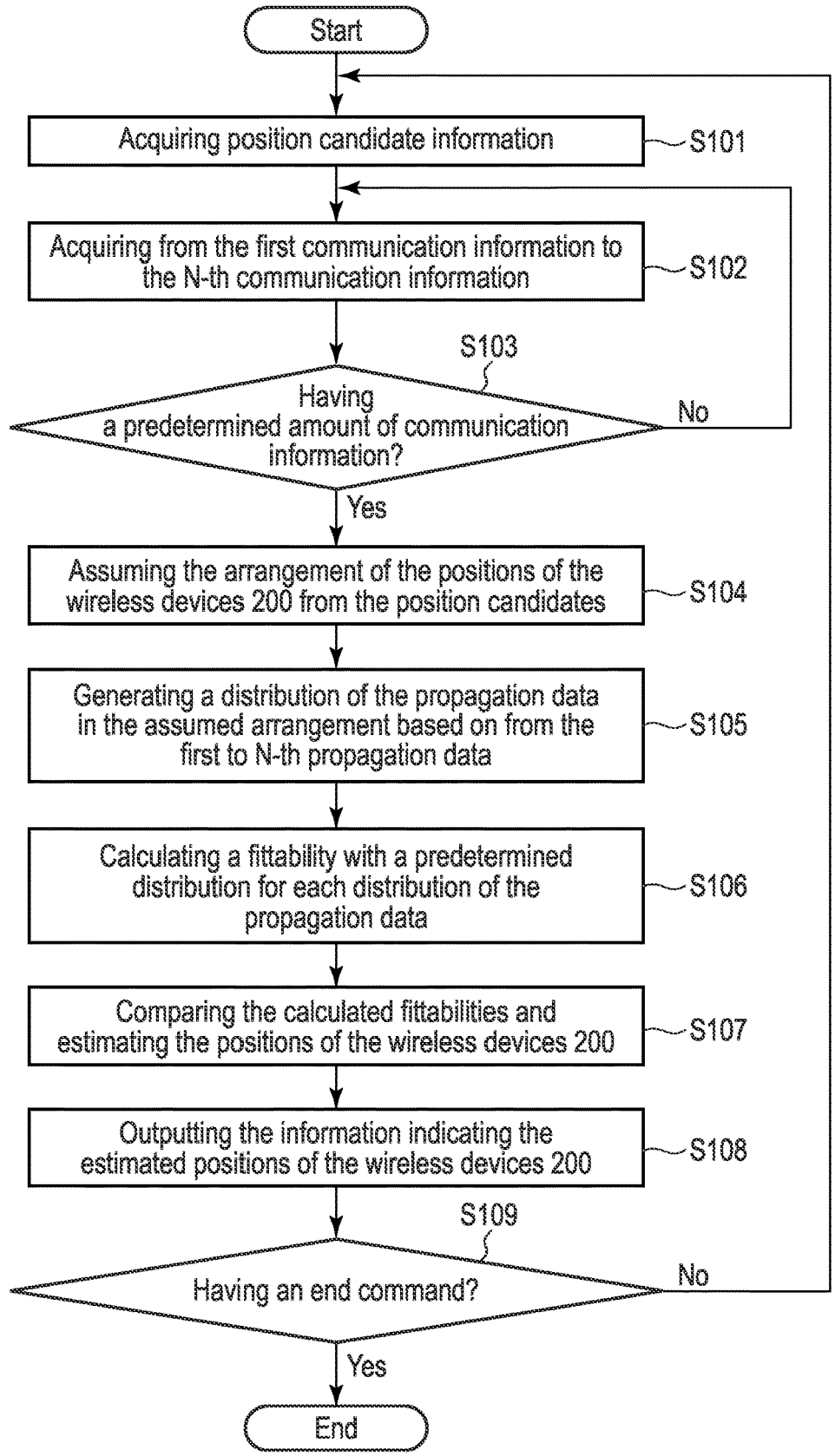
F I G. 4

| ID of transmission side | ID of reception side | Receiving power | Receiving time | Polarized wave | Frequency CH | Transmission antenna identifier | | Reception antenna identifier | Stirring |
|---|---|---|---|---|---|---|---|---|---|
| d2 | d1 | −25 dBm | t11 | Vertical | 1 | 2021d1 | 2021d3 | 2021d2 | Absence |
| d3 | d1 | −23 dBm | t12 | Vertical | 1 | 2021d1 | 2021d3 | 2021d2 | Absence |
| ... | ... | ... | ... | ... | ... | ... | ... | ... | ... |
| dX | d1 | −55 dBm | t1X | Vertical | 1 | 2021d1 | 2021dX | 2021d2 | Absence |
| d2 | d1 | −24 dBm | t21 | Horizontal | 1 | 2022d1 | 2022d3 | 2022d2 | Absence |
| d3 | d1 | −26 dBm | t22 | Horizontal | 1 | 2022d1 | 2022d3 | 2022d2 | Absence |
| ... | ... | ... | ... | ... | ... | ... | ... | ... | ... |
| dX | d1 | −58 dBm | t2X | Horizontal | 1 | 2022d1 | 2022dX | 2022d2 | Absence |
| ... | ... | ... | ... | ... | ... | ... | ... | ... | ... |
| d2 | d1 | −21 dBm | tN1 | Vertical | k | 202Ld1 | 202Ld3 | 202Ld2 | Presence |
| d3 | d1 | −22 dBm | tN2 | Vertical | k | 202Ld1 | 202Ld3 | 202Ld2 | Presence |
| ... | ... | ... | ... | ... | ... | ... | ... | ... | ... |
| dX | d1 | −54 dBm | tNX | Vertical | k | 202Ld1 | 202LdX | 202Ld2 | Presence |

First communication Info.: rows 1–4. Second communication Info.: rows 5–8. N-th communication Info.: last rows.

F I G. 7

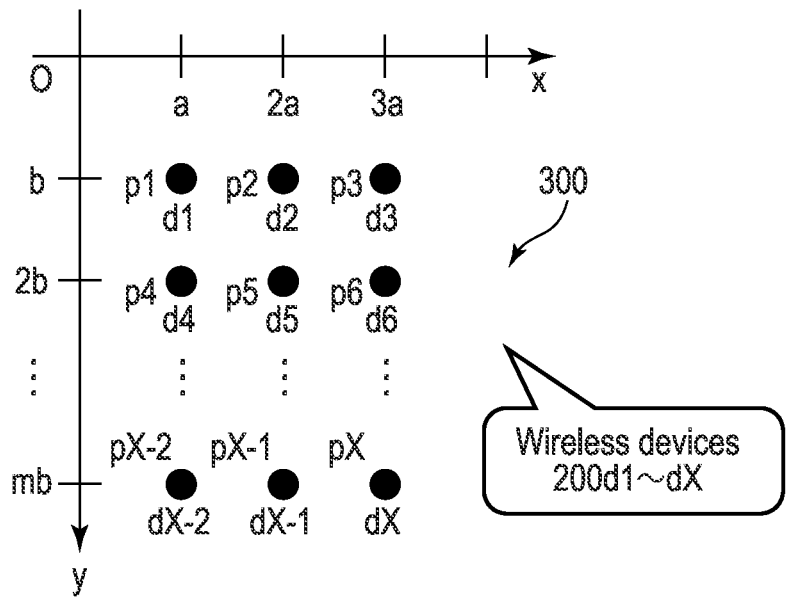
F I G. 8
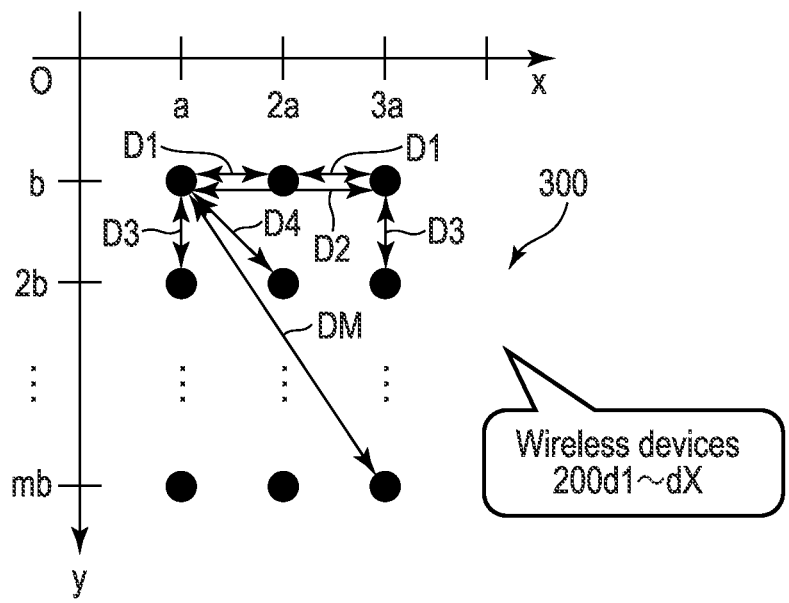
F I G. 9

| | ID of transmission side | ID of reception side | Receiving power | Receiving time | Polarized wave | Frequency CH | Transmission antenna identifier | Reception antenna identifier | Stirring | Virtual distance |
|---|---|---|---|---|---|---|---|---|---|---|
| First communication Info. | d2 | d1 | -25 dBm | t11 | Vertical | 1 | 2021d1 | 2021d2 | Absence | D1 |
| | d3 | d1 | -23 dBm | t12 | Vertical | 1 | 2021d3 | 2021d2 | Absence | D2 |
| | ... | ... | ... | ... | ... | ... | ... | ... | ... | ... |
| | dX | d1 | -55 dBm | t1X | Vertical | 1 | 2021dX | 2021d2 | Absence | DX |
| Second communication Info. | d2 | d1 | -24 dBm | t21 | Horizontal | 1 | 2022d1 | 2022d2 | Absence | D1 |
| | d3 | d1 | -26 dBm | t22 | Horizontal | 1 | 2022d3 | 2022d2 | Absence | D2 |
| | ... | ... | ... | ... | ... | ... | ... | ... | ... | ... |
| | dX | d1 | -58 dBm | t2X | Horizontal | 1 | 2022dX | 2022d2 | Absence | DX |
| ... | ... | ... | ... | ... | ... | ... | ... | ... | ... | ... |
| N-th communication Info. | d2 | d1 | -21 dBm | tN1 | Vertical | k | 202Ld1 | 202Ld2 | Presence | D1 |
| | d3 | d1 | -22 dBm | tN2 | Vertical | k | 202Ld3 | 202Ld2 | Presence | D2 |
| | ... | ... | ... | ... | ... | ... | ... | ... | ... | ... |
| | dX | d1 | -54 dBm | tNX | Vertical | k | 202LdX | 202Ld2 | Presence | DX |

F I G. 10

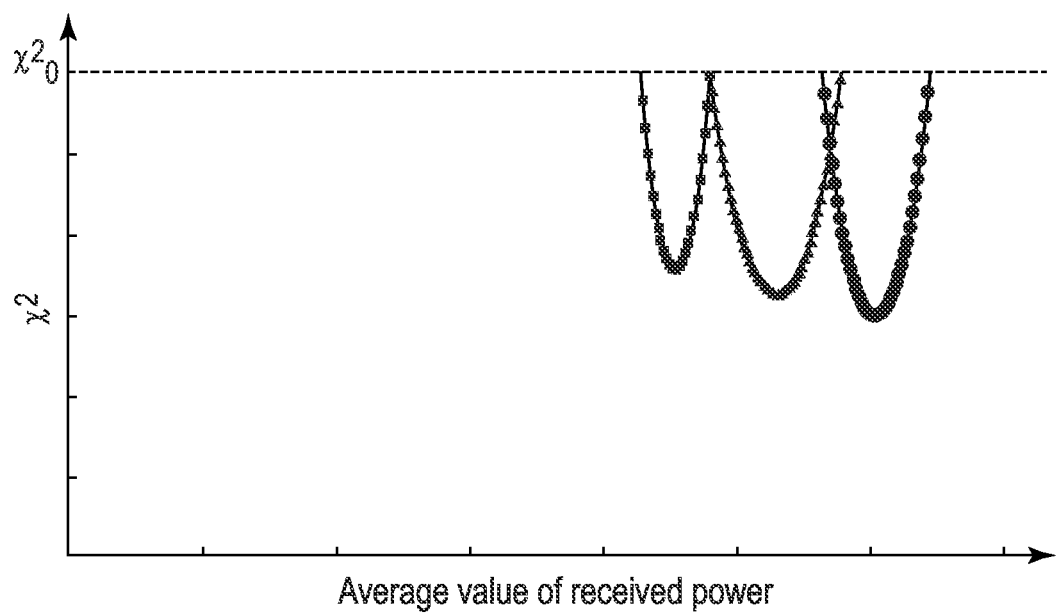
F I G. 17
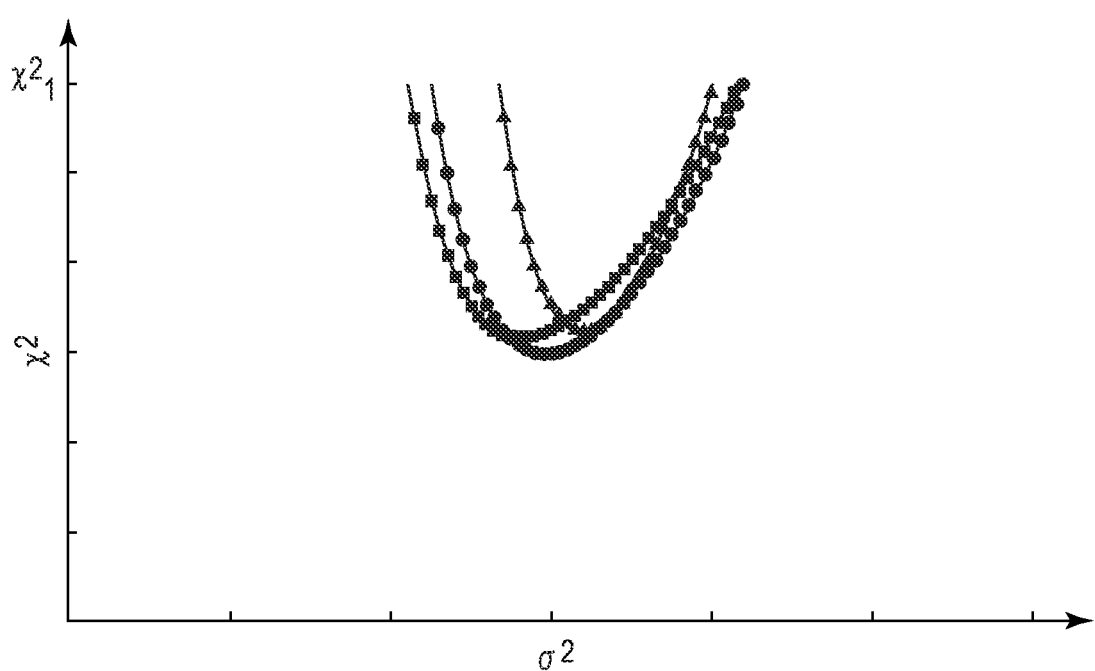
F I G. 18

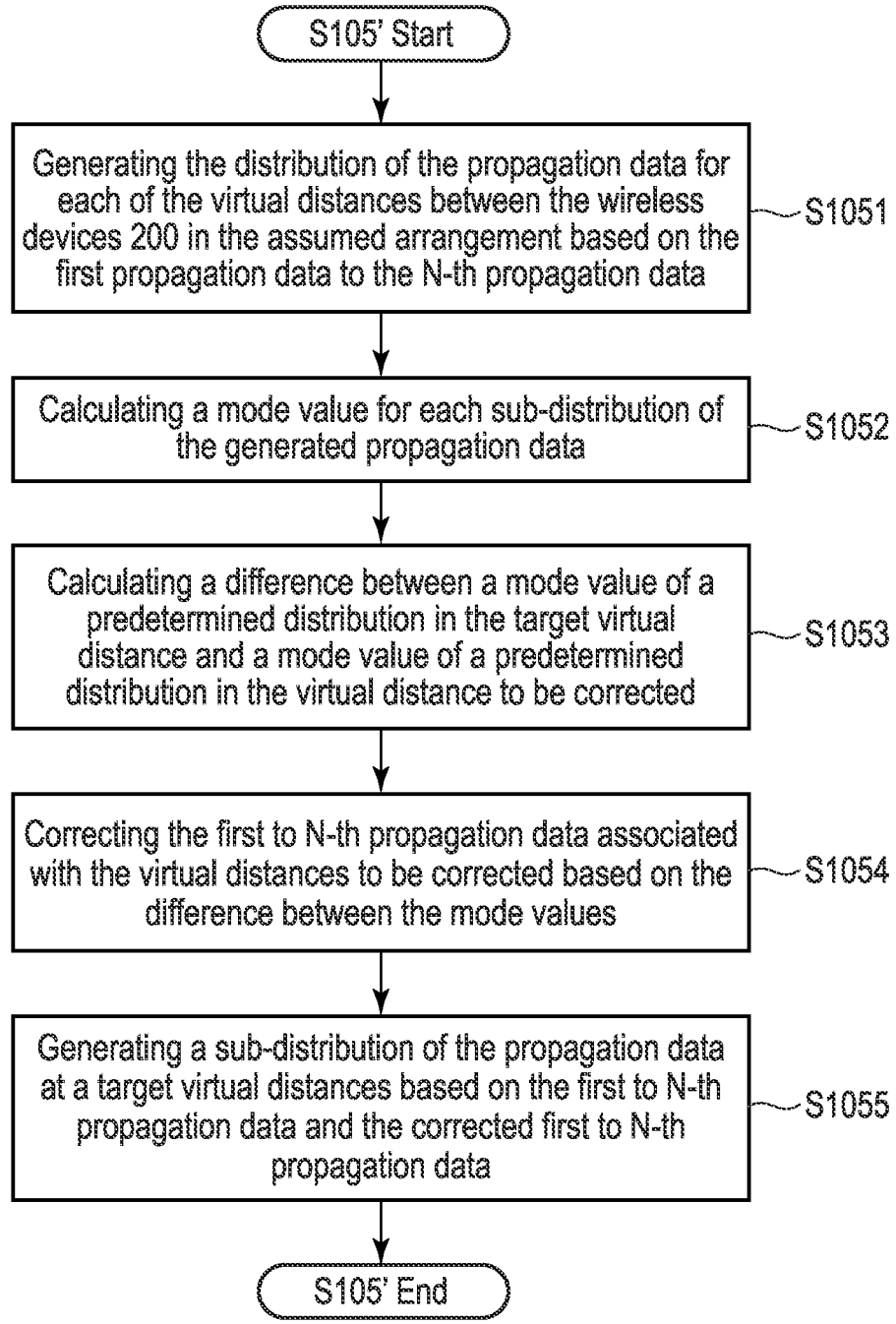
F I G. 26

ELECTRONIC APPARATUS, ELECTRONIC SYSTEM, AND METHOD

CROSS-REFERENCE TO RELATED APPLICATIONS

This application is based upon and claims the benefit of priority from Japanese Patent Application No. 2021-123930, filed Jul. 29, 2021, the entire contents of which are incorporated herein by reference.

FIELD

Embodiments described herein relate generally to an electronic apparatus, an electronic system, and a method.

BACKGROUND

It is known to measure propagation characteristics (for example, RSSI or the like) between a plurality of wireless devices, and to estimate a position where each of the plurality of wireless devices is located. Here, depending on a situation in which the plurality of wireless devices is located, there is a possibility that the measured propagation characteristics fluctuate and influence the estimation. It is desirable to improve an accuracy of the estimation of the location where each of a plurality of wireless devices is located.

BRIEF DESCRIPTION OF THE DRAWINGS

FIG. 4 is a flowchart of an estimation operation of the estimation apparatus 100 according to the first embodiment.

FIG. 7 is a diagram illustrating an example of from first communication information to N-th communication information.

FIG. 8 is a diagram illustrating an example of an arrangement of the wireless devices 200 assumed by a distribution generator 112.

FIG. 9 is a diagram showing distances between the position candidates.

FIG. 10 is a diagram illustrating information in which from the first communication information to the N-th communication information of FIG. 7 are associated with virtual distances.

FIG. 17 is a diagram illustrating an example of a fittability in a case where an average value of received power is moved as a parameter with respect to distributions of propagation data associated with virtual distances D1 to D3 of the first distribution and predetermined distributions.

FIG. 18 is a diagram illustrating an example of the fittability in a case where the distributions of the propagation data associated with the virtual distances D1 to D3 of the first distribution and the predetermined distributions are moved using a variance $\sigma^2$ as a parameter.

FIG. 26 is a detailed flowchart of step S105' in this modification.

DETAILED DESCRIPTION

Figure 1:
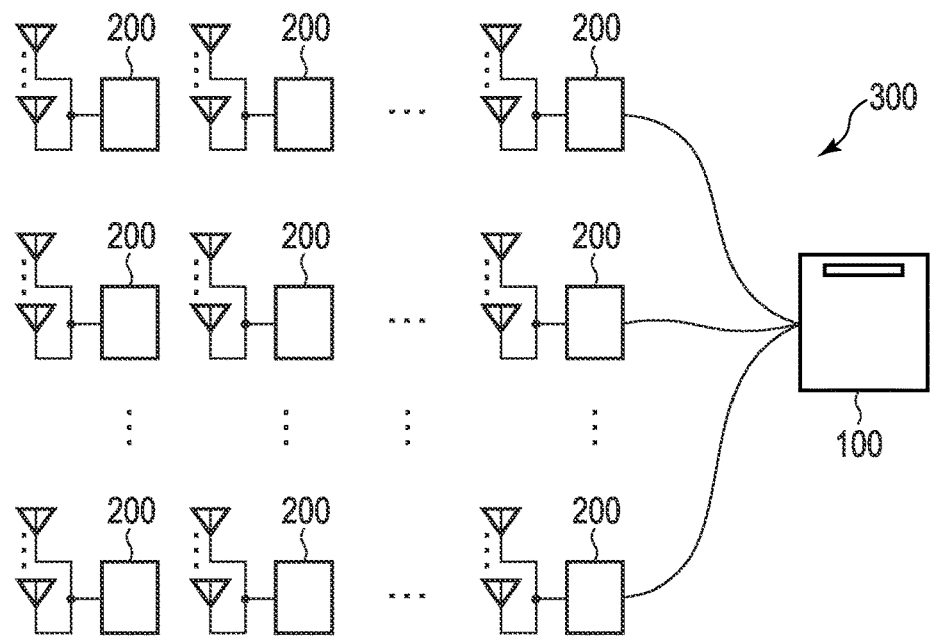
FIG. 1 is a schematic diagram of a communication system 300 according to a first embodiment.

In general, according to one embodiment, an electronic apparatus includes a processor configured to estimate positions where wireless devices communicating each other are located from position candidates based on position candidate information indicating the position candidates of the wireless devices and from first communication information in communication using a first propagation path between the wireless devices to N-th communication information in communication using a N-th propagation path (N: an integer of 2 or more) between the wireless devices.

Various embodiments will be described hereinafter with reference to the accompanying drawings. Disclosure is only an example, invention is not limited by the contents described in the following embodiments. In the drawings, the size, shape, and the like may be schematically represented to make the description more clear. In the multiple drawings, corresponding elements are denoted by the same reference numerals, and detailed description may be omitted.

First Embodiment

The first embodiment will be described. FIG. 1 shows a communication system 300 according to the first embodiment. The communication system 300 includes an estimation apparatus 100 and a plurality of wireless devices 200. The estimation apparatus 100 is a device that estimates, based on information indicating candidates of positions at which the wireless devices 200 are located (hereinafter also referred to as position candidates) and information in communication between the wireless devices 200 (hereinafter also referred to as communication information), positions at which of the wireless devices 200 are located from the position candidates. The information indicating the position candidates is also referred to as position candidate information. The estimation apparatus 100 is also referred to as an electronic apparatus, and the communication system 300 is also referred to as an electronic system.

As an application example, in a case where the wireless device 200 is provided in a device, apparatus, or machine, for example, a battery module, a lighting apparatus, an air conditioner, or the like, the estimation apparatus 100 can estimate the position of the device, apparatus, or machine provided with the wireless device 200 by estimating the position of the wireless device 200. Although FIG. 1 shows the communication system 300 in which the wireless devices 200 are arranged in a grid pattern, the arrangement of the wireless devices 200 is not limited to this case. Each of the estimation apparatus 100 and the wireless device 200 is located at any one of the position candidates, and communication can be performed between the estimation apparatus 100 and the wireless device 200 and between the plurality of wireless devices 200. Communication includes at least one of exchange required for communication, transmission or reception of a signal. Although FIG. 1 illustrates a case in which communication between the estimation apparatus 100 and the wireless device 200 is performed in a wired manner and communication between the wireless devices 200 is performed in a wireless manner, connection of these communications may be wireless or wired. Any standard such as Wifi (registered trademark), Bluetooth (registered trademark), or UWB (Ultra Wide Band) can be applied as the wireless communication standard.

When estimating the positions of the wireless devices 200, the estimation apparatus 100 acquires communication information in communication performed for each of a plurality of propagation paths as communication information between the wireless devices 200. For example, when the wireless devices 200 performs communication using from a first propagation path to an N-th propagation path (N is an integer of 2 or more), the estimation apparatus 100 acquires, as communication information, from first communication information in communication using the first propagation path between the wireless devices 200 to N-th communication information in communication using the N-th propagation path between the wireless devices 200. The estimation apparatus 100 estimates the position where the wireless device 200 is located from a plurality of position candidates based on the position candidate information and from the first communication information to the N-th communication information. In communication between the wireless devices 200, propagation characteristics may deviate from a general tendency depending on a propagation path. Therefore, by using communication information in communication between the wireless devices 200 using a plurality of propagation paths, it is possible to improve accuracy of the estimation of the locations of the wireless devices 200.

Figure 2:
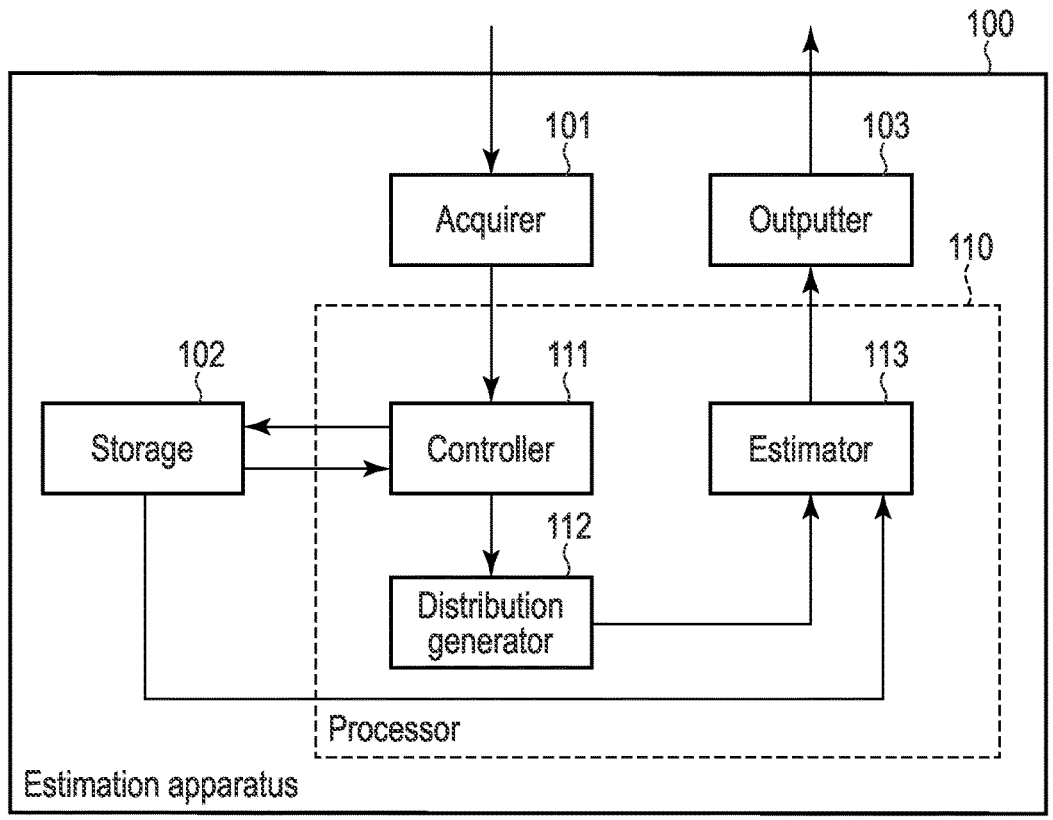
FIG. 2 is a configuration diagram of an estimation apparatus 100 according to the first embodiment.

FIG. 2 is a configuration diagram of the estimation apparatus 100. The estimation apparatus 100 includes an acquirer 101, a processor 110, a storage 102, and an outputter 103. The processor 110 includes a controller 111, a distribution generator 112, and an estimator 113.

The acquirer 101 is a device or an element that acquires position candidate information and from first communication information to N-th communication information. The acquirer 101 acquires these pieces of information by performing an information processing on an input or an object. For example, the acquirer 101 may acquire the position candidate information by an input from a user, may acquire the position candidate information by image processing or the like by inputting or scanning a drawing describing positions where the wireless devices 200 are located, or may acquire the position candidate information by image processing or the like by capturing or inputting an image representing an installation situation of the wireless device 200. The acquirer 101 acquires from the first communication information to the N-th communication information from the wireless device 200, the acquirer 101 may acquire from the first communication information to the N-th communication information by wired communication or wireless communication. In addition, the acquirer 101 may acquire at least some of from the first communication information to the N-th communication information not directly from the wireless device 200 but via a collection device, a recording device, a database, or the like.

The communication information includes, for example, propagation data such as received power (RSSI: Received Signal Strength Indicator), a signal-to-noise ratio (SN ratio: Signal to Noise Ratio), and an error rate (PER: Packet Error Rate) in communication between the plurality of wireless devices 200, and identification information of the wireless device 200 in communication between the plurality of wireless devices 200 (hereinafter also referred to as wireless device identification information). The wireless device identification information is information for identifying each wireless device 200. The wireless device identification information is, for example, a MAC address or an 1P address, any information can be applied as long as each wireless device 200 can be individually specified. The communication information includes at least one of identification information of an antenna used for communication by the wireless device 200 (hereinafter also referred to as antenna identification information), reception time information of a signal used for communication (hereinafter also referred to as reception time information), information indicating a frequency band used for communication (hereinafter also referred to as frequency information), or information of a polarized wave used for communication (hereinafter also referred to as polarized wave information). The "frequency" of the frequency band and of the frequency information indicates the number of radio waves, sound waves etc., that pass any point per second. The antenna identification information is information for specifying an antenna provided in each of the wireless devices 200, and any information can be applied as long as each antenna can be individually specified.

The estimation apparatus 100 can individually specify each wireless device 200 included in the communication system 300 based on the wireless device identification information. In a case where the antenna identification information is included in the communication information, the estimation apparatus 100 can individually specify the antenna included in each of the wireless devices 200 based on the antenna identification information. The position candidate information and from the first communication information to the N-th communication information are held in the storage 102, extracted from the storage 102, and sent to the distribution generator 112.

The storage 102 holds information sent from the controller 111 and information used by the estimator 113. The storage 102 is a memory or the like, and is, for example, a random access memory (RAM), a programmable ROM (PROM), an erasable PROM (EPROM), an electrically EPROM (EEPROM), a flash memory, a register, or the like. The storage 102 may be provided not only inside the estimation apparatus 100 but also outside the estimation apparatus 100. When located externally, the storage 102 may be a cloud that holds information via the Internet.

The controller 111 causes the storage 102 to hold the information sent from the acquirer 101, for example, the position candidate information and from the first communication information to the N-th communication information. In addition, the controller 111 extracts the position candidate information and from the first communication information to the N-th communication information from the storage 102 and sends them to the distribution generator 112. In addition, the controller 111 may cause the storage 102 to hold information indicating the positions of the wireless devices 200 estimated by the estimator 113.

Based on the position candidate information sent from the controller 111, the distribution generator 112 assumes a plurality of arrangements from the position candidates for the positions where the wireless devices 200 are located. Mere, the arrangement refers to determining the wireless devices 200 located in the position candidates. For example, it is assumed that there are two wireless devices p1 and p2 for two position candidates 200d1 and 200d2. In this case, two arrangements of (p1, 200d1), (p2, 200d2), (p1, 200d2), and (p2, 200d1) are assumed.

The distribution generator 112 generates a distribution of propagation data in an assumed arrangement based on from propagation data included in first communication information (hereinafter also referred to as first propagation data) to propagation data included in N-th communication information (hereinafter also referred to as N-th propagation data). The distribution of the propagation data is generated for each assumed arrangement. For example, when the distribution generator 112 assumes from a first arrangement to an n-th arrangement (n is an integer of 2 or more) for the positions of the wireless devices 200, from a first distribution of propagation data in the first arrangement to an n-th distribution of propagation data in the n-th arrangement are generated.

As the distribution of the propagation data, for example, a distribution such as a probability density distribution, a histogram, or a cumulative probability distribution is generated. By using propagation data in communication using from the first propagation path to the N-th propagation path, it is possible to reduce the influence of an outlier of a propagation characteristic caused by the influence of at least one of a time at which communication is performed (a signal is transmitted or received), the type of an electromagnetic wave, a frequency band, an airflow between the wireless devices 200, or an antenna used for communication between the wireless devices 200. Information on the arrangement of the wireless devices 200 assumed by the distribution generator 112 and the generated distribution of the propagation data are sent to the estimator 113.

The estimator 113 estimates the positions where the wireless devices 200 are located based on the distribution of the propagation data sent from the distribution generator 112. As an example, the estimator 113 calculates a fittability between a distribution of propagation data for each assumed arrangement of the wireless devices 200 and a predetermined distribution. For example, when the distribution generator 112 generates from the first distribution of the propagation data in the first arrangement to the n-th distribution of the propagation data in the n-th arrangement, the distribution generator 112 calculates from the first fittability between the first distribution and a predetermined distribution to the n-th fittability between the n-th distribution and a predetermined distribution. The predetermined distribution stored in the storage 102 may be extracted by the estimator 113, or the estimator 113 may generate the predetermined distribution based on information stored in the storage 102. As the type of the predetermined distribution, for example, a log-normal distribution, a Rayleigh distribution, an Nakagami-m distribution, or the like can be used. Note that it is not necessary to always use the same distribution as the predetermined distribution, and the type, distribution parameters, or the like of the predetermined distribution can be adjusted as appropriate.

The estimator 113 compares the plurality of calculated fittabilities and determines a distribution fitting to a predetermined distribution. As an example, the estimator 113 determines a distribution having the highest fittability, and estimates the arrangement of the wireless devices 200 in the determined distribution as the position where the wireless devices 200 are located. For example, assuming that the first fittability and the second fittability are extracted, the estimator 113 determines a distribution having a higher fittability in the first fittability and the second fittability, and estimates the arrangement of the wireless devices 200 in the determined distribution as the position where the wireless devices 200 are located. The estimator 113 sends information indicating the estimated position where the wireless devices 200 are located to the outputter 103.

The outputter 103 is a device or an element that outputs information indicating the estimated position where the wireless devices 200 are located, which is sent from the estimator 113. An output destination of this information is freely-selected, and may be, for example, any of an information analysis device, a device that visually displays the positions where the wireless devices 200 are located, a device that holds information, or the like. These devices may be elements inside the estimation apparatus 100 (not illustrated) or may be located outside the estimation apparatus 100. Further, the form of the information indicating the estimated positions of the wireless devices 200 may be any of text data, image data, formatted data, or the like.

The configuration of the estimation apparatus 100 has been described above. In FIG. 2, the controller 111, the distribution generator 112, and the estimator 113 are included in the processor 110. The processor 110 is one or more electronic circuits including a control device and an arithmetic device. The electronic circuit is realized by an analog or digital circuit or the like. For example, a general purpose processor, central processing unit (CPU), microprocessor, digital signal processor (LISP), ASIC, FPGA, and combinations thereof can be applied. Further, the functions of the processor 110 may be executed by these electronic circuits by software.

Note that the estimator 113 may send information indicating the estimated position of the wireless devices 200 to the controller 111. The controller 111 may cause the storage 102 to hold this information, and may extract this information as necessary and send it to the outputter 103.

Figure 3:
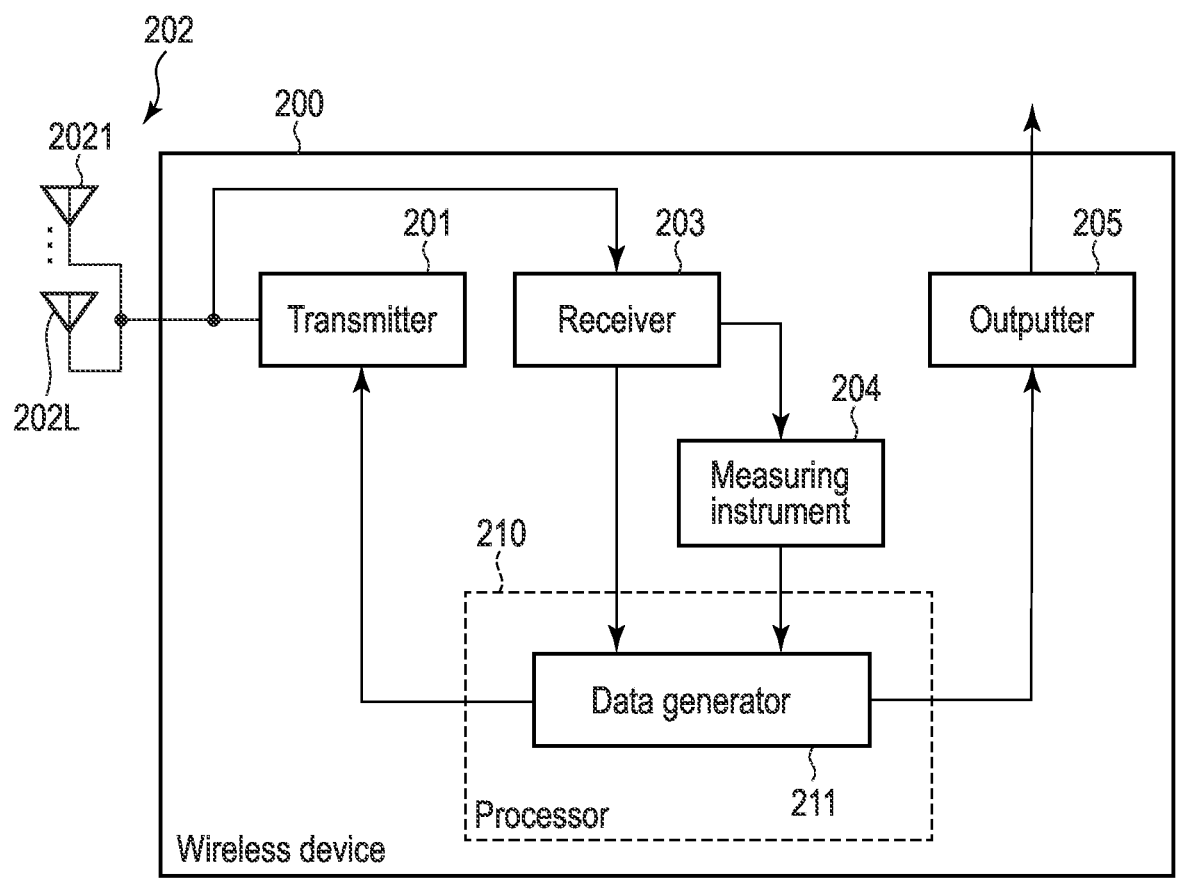
FIG. 3 is a configuration diagram of a wireless device 200 according to the first embodiment.

FIG. 3 is a configuration diagram of the wireless device 200. The wireless device 200 includes a transmitter 201, an antenna unit 202, a receiver 203, a measuring instrument 204, a processor 210, and an outputter 205. The antenna unit 202 is an array antenna including L antennas (L: an integer equal to or greater than 2), antenna unit 2021 to 202L. The processor 210 includes a data generator 211.

The transmitter 201 modulates a signal for measuring propagation data between the wireless devices 200 and transmits the signal via the antenna unit 202 (hereinafter, the signal also referred to as a transmission signal). The transmitter 201 transmits this transmission signal using from the first propagation path to the N-th propagation path. The first to N-th propagation paths differ from each other in at least one of airflow between communicating wireless devices 200, frequency bands used in communication between wireless devices 200, types of electromagnetic waves (for example, polarized waves) used in communication between wireless devices 200, antennas used in communication between wireless devices 200, time period used in communication between wireless devices 200, presence or absence or level of vibration generated in communicating wireless devices 200, or directivity of signals in communication between wireless devices 200. The transmission signal includes wireless device identification information of the wireless device 200 as a transmission source. In addition, the transmission signal may further include at least, one of antenna identification information of an antenna that radiates the transmission signal, frequency information indicating a frequency band used for communication, information indicating a type of an electromagnetic wave of the transmission signal, or information indicating an airflow between the wireless devices 200 that perform communication. The transmission form freely selected, for example, the wireless device as a transmission source may designate a wireless device of a transmission destination, transmission may be performed by broadcast, or transmission may be performed in synchronization between the wireless devices that communicate.

The antenna unit. 202 is an array antenna including L antennas 2021, . . . , 202L. The antenna unit 202 radiates a transmission signal sent from the transmitter 201, and the antenna unit 202 is also used to receive a signal for measuring propagation data between communication destination wireless devices 200 sent from the communication destination wireless devices 200 (hereinafter, this signal is also referred to as a reception signal). When transmitting a transmission signal or receiving a reception signal, the antenna unit 202 may perform transmission or reception while switching antennas. For example, the antennas may be switched at predetermined time intervals or by synchronizing with the wireless device 200 of the communication destination.

The receiver 203 receives and demodulates a signal transmitted from the wireless device 200 of the communication destination via the antenna unit 202. Hereinafter, this signal is also referred to as a received signal. The reception signal includes at least wireless device identification information of the wireless device 200 of the transmission source. The receiver 203 sends information included in the received signal and wireless device identification information of the receiving side (itself) to the data generator 211. The receiver 203 also sends the received signal to the measuring instrument 204. In a case where the antenna identification information of the wireless device 200 of the transmission source is included in the reception signal, the receiver 203 may transmit the antenna identification information of the reception side (itself) to the data generator 211. Further, the receiver 203 may send information indicating the time at which the reception signal is received to the data generator 211, may send information indicating the type of electromagnetic wave (for example, polarized wave) to which the reception signal is transmitted to the data generator 211 if the type of electromagnetic wave can be identified, or may send information indicating an airflow between the communicating wireless devices 200 to the data generator 211 if the airflow can be identified.

The measuring instrument 204 measures propagation data from the reception signal sent from the receiver 203. The measured propagation data is sent to the data generator 211. The measurement value of the propagation data may be a value measured once, may be a maximum value, a minimum value, a mode value, a median value, or an average value measured a plurality of times.

The data generator 211 generates communication information by associating information included in the reception signal sent from the receiver 203 (for example, wireless device identification information of the wireless devices on the transmission side and the reception side) with the propagation data of the reception signal sent from the measuring instrument 204. The data generator 211 sends the generated communication information to the outputter 205. When at least one of antenna identification information of the receiving side (itself), information indicating the time at which the received signal is received, information indicating the type of electromagnetic wave, information indicating airflow, or the like is sent from the receiver 203, the data generator 211 generates the communication information in association with the information included in the received signal and the propagation data.

When the wireless device 200 serves as a transmission side, the data generator 211 generates the transmission signal and sends the transmission signal to the transmitter 201.

The outputter 205 outputs the communication information transmitted from the data generator 211 to the estimation apparatus 100. The form of this output is optional, for example, as illustrated in FIG. 1, in a case where the wireless device 200 and the estimation apparatus 100 are connected to each other by wire, the output is performed by wire. In a case where the wireless device 200 and the estimation apparatus 100 are wirelessly connected, the outputter 205 may be integrated with the transmitter 201 and output to the estimation apparatus 100 via the antenna unit 202. In addition, the outputter 205 may output the communication information to an external storage device or a cloud to hold the communication information. In this case, the estimation apparatus 100 extracts and acquires communication information from the external storage device or cloud.

The configuration of the wireless device 200 has been described above. In the communication system 300 of the present embodiment, it is assumed that the wireless device 200 has at least the components described above. In FIG. 3, the measuring instrument 204 is not included in the processor 210, but may be included in the processor 210 depending on propagation data to be measured. For example, in a case where digital processing is necessary for measurement of propagation data. R device similar to the device described in the processor 110 can be applied to the processor 210, and the function thereof may be executed by software.

FIG. 4 is a flowchart of an estimation operation of the estimation apparatus 100. Hereinafter, the operation of the estimation apparatus 100 will be described in detail with reference to FIG. 4. It is assumed that an action needed for communication between the wireless devices 200 has already been completed. The estimation apparatus 100 specifies each of the wireless devices 200 based on the wireless device identification information included in the communication information. Further, in the present embodiment, as an example, a case where propagation data is received power (RSSI) will be described.

Figure 5:
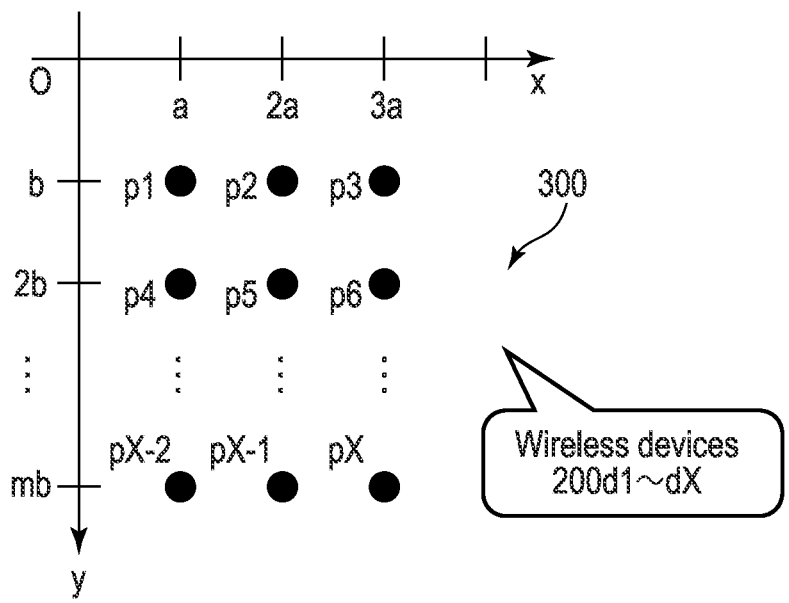
FIG. 5 is a diagram illustrating an example of position candidates of the communication system 300.

The acquirer 101 acquires the position candidate information (step S101). FIG. 5 is a diagram illustrating an example of the position candidates. It is assumed that the communication system 300 according to the present embodiment includes X (X is a natural number equal to or greater than 2) position candidates p1 to pX, and each of the wireless devices 200d1 to 200dX is located in one of the position candidates. The positions (coordinates) of the position candidates p1 to pX are clarified by the position candidate information. For example, in FIG. 5, each of the position candidates p1 to pX is specified by an x coordinate and a y coordinate. For example, the position candidate p1 is expressed as (z, y)=(a, b) (a and b are any numbers), the position candidate p2 is expressed as (x, y)=(2a, b), . . . , and the position candidate pX is expressed as (x, y)=(3a, mb) (m is a natural number). The estimation apparatus 100 recognizes that the wireless devices 200 are X wireless devices 200d1 to 200dX based on the wireless device identification information included in the communication information to be acquired later. At this time, the estimation apparatus 100 does not know in which position candidate the wireless devices 200d1 to 200dX are located. The acquired position candidate information is sent to the controller 111 and is held in the storage 102 by the controller 111.

The acquirer 101 acquires from the first communication information in communication using the first propagation path to N-th communication information in communication using the N-th propagation path between the wireless devices 200 (step S102). Although the acquirer 101 acquires the first communication information to the N-th communication information from the wireless devices 200, generation of the first communication information to the N-th communication information performed by each of the wireless devices 200 will be described below.

Figure 6:
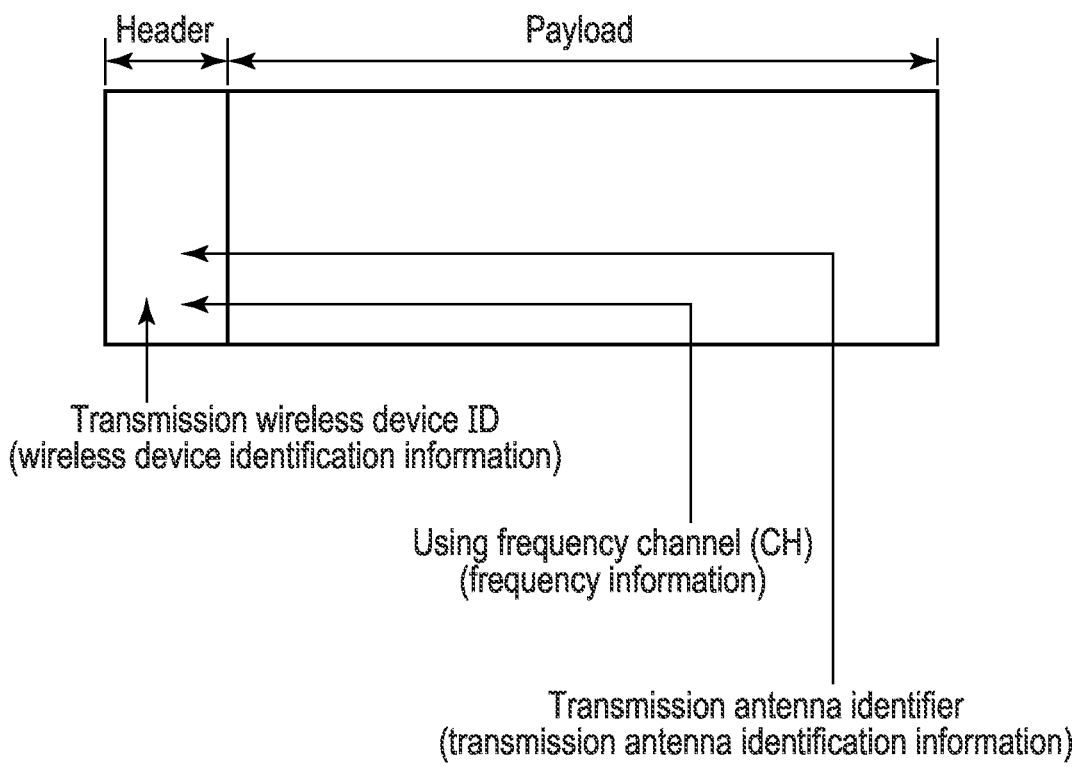
FIG. 6 is a diagram illustrating an example of a transmission signal.

The wireless device 200 on the transmission side modulates the transmission signal used for measurement of propagation data and transmits the modulated signal. FIG. 6 is a diagram illustrating an example of the transmission signal according to the present embodiment. In the transmission signal of the present embodiment, a transmission wireless device IG as the wireless device identification information of the wireless device 200 on the transmission side, a transmission antenna identifier as the transmission antenna identification information of the wireless device 200 on the transmission side, and a using frequency channel (CH) as the frequency information used for communication by the wireless device 200 on the transmission side are incorporated in a header of the transmission signal. The wireless device 200 on the transmission side transmits the transmission signal to the wireless device 200 on the transmission destination (reception side) using from the first propagation path to the N-th propagation path.

As an example in the present embodiment, from the first propagation path to the N-th propagation path differ in at least one of polarized wave as the type of electromagnetic wave, a frequency band used for communication between the transmission-side wireless device 200 and the transmission-destination (reception-side) wireless device 200, an antenna used for communication between the transmission-side wireless device 200 and the transmission-destination (reception-side) wireless device 200, or presence or absence of airflow agitation as the airflow between the transmission-side wireless device 200 and the transmission-destination (reception-side) wireless device 200. Other than at least one of the elements described above may not be considered. In addition, in a case where a time period during which communication between the wireless devices 200 is performed is changed, even if the above elements are the same, it may be considered that communication is performed using different propagation paths.

The transmission signal is received as the reception signal by the wireless device 200 on the reception side and demodulated. Further, received power of the received signal is measured as the propagation data. The data generator 211 of the wireless device 200 on the reception side generates from first communication information to N-th communication information by associating information included in the reception signal, the received power of the reception signal, the reception wireless device ID as the wireless device identification information of the wireless device 200 on the reception side, and a reception antenna identifier as the antenna identification information of the wireless device 200 on the reception side. In the present embodiment, in the generation from the first communication information to the N-th communication information, the data generator 211 of the wireless device 200 on the reception side further associates information indicating the type of polarized wave as the type of electromagnetic wave of the reception signal with information indicating the time at which the reception signal is received. The information indicating the type of polarized wave may be included in the transmission signal (reception signal). The information indicating whether or not the airflow is stirred may be obtained by a device for measuring the airflow in the electronic system 300, the device for measuring the airflow may measure the airflow, and transmit the information indicating whether or not the airflow is stirred (may be the presence or level of the airflow) to the wireless device 200 or the estimation apparatus 100. Alternatively, the electronic system 300 may be provided with a device that generates stirring to stir the airflow, and the device may transmit the information indicating whether or not the airflow is stirred (or whether or not the airflow is stirred or the level of the airflow) to the wireless device 200 or the estimation apparatus 100.

FIG. 7 is a diagram illustrating an example from the first communication information to N-th communication information according to the present embodiment. In FIG. 7, from the first communication information to the N-th communication information include transmitting wireless device IDs, receiving wireless device IDs, received power (propagation data), received signal reception time, electromagnetic wave types (polarized wave) of the received signals, frequency channels (CH, k is an integer of 2 or more) used for communication, transmitting antenna identifiers, receiving antenna identifiers, and information indicating presence or absence of airflow agitation. The received power is expressed in decibels (dBm, the smaller an absolute value, the greater the received power).

In the present embodiment, from the first communication information to the N-th communication information can be identified based on at least one of the type of an electromagnetic wave (polarized wave) of the reception signal, the frequency channel (CH) used for communication, the transmission antenna identifier, the reception antenna identifier, the information indicating whether or not airflow is stirred, or the like. In addition, from the first, communication information to the N-th communication information can also be identified based on at least one of the reception time (reception time period) of the received signal, the information indicating the presence or absence or level of vibration generated in the wireless device 200, the information indicating the directivity of the signal in communication between the wireless devices 200, or the like. Note that the information indicating the presence or absence or level of vibration generated in the wireless device 200 may be obtained by providing a device for measuring vibration in the electronic system 300, the device may measure the vibration, and transmit the information indicating the presence or absence or level of vibration to the wireless device 200 or the estimation apparatus 100. The information indicating the directivity of the signal in the communication between the wireless devices may be included in the transmission signal by the wireless device 200 on the transmission side or may be generated by the wireless device 200 on the reception side by receiving the reception signal.

From the first communication information to the N-th communication information are output from the outputter 205 of the wireless device 200 on the reception side and acquired by the acquirer 101. In FIG. 7, the wireless devices 200 on the transmission side are denoted by wireless devices 200d2 to 200dX, and the wireless device on the reception side is denoted by wireless device 200d1.

In the above description, the wireless device 200d1 is the wireless device 200 on the reception side, but the wireless device 200 on the transmission side and the wireless device 200 on the reception side perform communication while being switched. Finally, each of the wireless devices 200d1 to 200dX generates from the first communication information to the N-th communication information through communication with the wireless device 200 other than itself. From the first communication information to the N-th communication information are output from the respective outputters 205 and are acquired by the acquirer 101. From the first communication information to the N-th communication information acquired by the acquirer 101 are sent to the controller 111, and the controller 111 causes the storage 102 to hold from the first communication information to the N-th communication information.

The controller 111 checks whether or not from the first communication information to the N-th communication information stored in the storage 102 have a predetermined amount (step S103)). The type of this amount is predetermined, for example, the data capacity, the number of data, or the like can be applied. Also, the amount may be predetermined. In this embodiment, the type and the amount of information are set in the controller 111 in advance, and the step S103 is checked. In a case where from the first communication information to the N-th communication information do not satisfy the predetermined amount (step S103: No), the process returns to step S102 and the acquisition from the first communication information to the N-th communication information is continued. Step S103 and subsequent steps may be performed at predetermined time intervals separately from the acquisition from the first communication information to the N-th communication information of step S102.

On the other hand, when from the first communication information to the N-th communication information satisfy the predetermined amount (step S103: Yes), the controller 111 reads the position candidate information and from the first communication information to the N-th communication information from the storage 102 and sends them to the distribution generator 112.

Based on the position candidate information sent from the controller 111, the distribution generator 112 assumes the arrangement of the positions where the wireless devices 200 are located from the position candidates (step S104). FIG. 8 is a diagram illustrating an example of the arrangement of the wireless devices 200 assumed by the distribution generator 112. In FIG. 8, the distribution generator 112 assumes that the wireless device 200d1 is located at the position candidate p1, the wireless device 200d2 is located at the position candidate p2, . . . , and the wireless device 200dX is located at the position candidate pX. Here, the arrangement of FIG. 8 is also referred to as a first arrangement. The distribution generator 112 assumes a plurality of such arrangements of the wireless devices 200. For example, the distribution generator 112 assumes from a first arrangement to an n-th arrangement in is an integer equal to or greater than 2) for the positions where the wireless devices 200 are located from the position candidates.

The distribution generator 112 generates a distribution of the propagation data in the assumed arrangement based on from the first to N-th propagation data (step S105). The distribution generator 112 recognizes distances between the position candidates based on the position candidate information. FIG. 9 is a diagram showing the distances between position candidates. For example, in FIG. 9, a space between the position candidates p1 and p2 is represented by a space D1, a space between the position candidates p1 and p3 is represented by a space D2, a space between the position candidates p1 and p4 is represented by a space D3, a space between the position candidates p1 and p5 is represented by a space D4, . . . , and a space between the position candidates p1 and pX is represented by a space DM.

The distribution generator 112 associates from the first communication information to the N-th communication information with the distances between the wireless devices 200 in the assumed arrangement for each assumed arrangement (hereinafter, distance between the wireless devices 200 is also referred to as virtual distance). FIG. 10 is a diagram illustrating information in which from the first communication information to the N-th communication information illustrated in FIG. 7 are associated with the virtual distances. Taking the first arrangement as an example, the distribution generator 112 associates from the first communication information to the N-th communication information by setting the virtual distances between the wireless devices 200d1 and 200d2 as distance D1, the virtual distances between the wireless devices 200d1 and 200d3 as distance D2, . . . , and the virtual distances between the wireless devices 200d1 and 200dX as distance DM.

Figure 11:
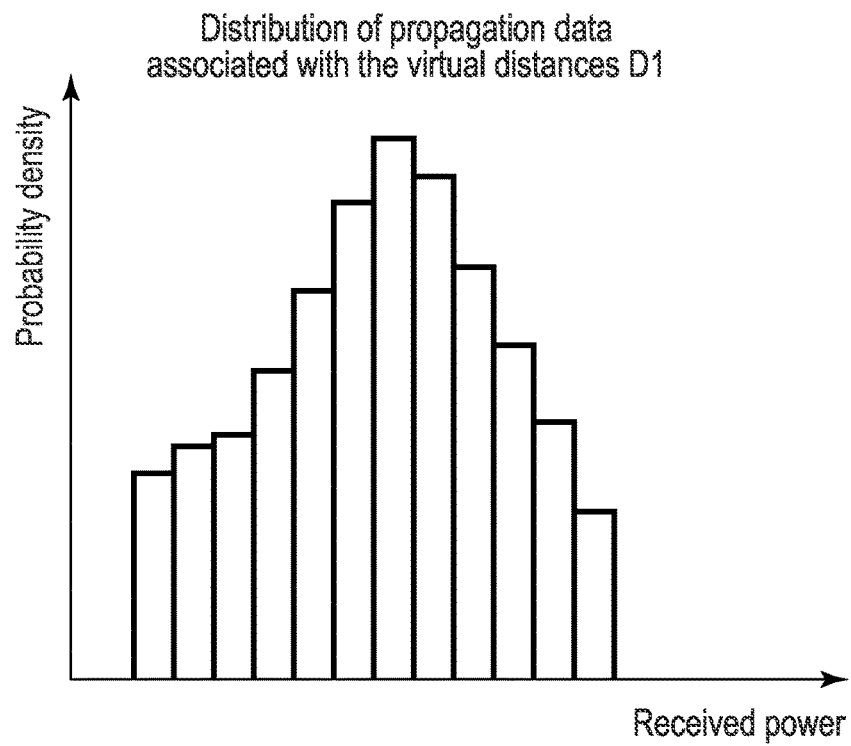
FIG. 11 is a diagram showing a distribution of propagation data associated with the virtual distances D1 in a first arrangement.

The distribution generator 112 generates a distribution of propagation data for each virtual distance of the arrangement. FIG. 11 shows a distribution of propagation data associated with the virtual distances D1 in the first arrangement. In the present embodiment, as an example, a received power distribution is represented as the distribution of propagation data, and received power intensities and probability densities in the virtual distance D1 are represented. In FIG. 11, the probability density is represented by giving a certain width to the received power, but any width can be applied.

The distribution generator 112 generates a distribution of propagation data from the assumed first arrangement to the assumed n-th arrangement. Hereinafter, the distribution of the propagation data in the first arrangement is also referred to as a first distribution, . . . , and the distribution of the propagation data in the n-th arrangement is also referred to as an n-th distribution. The distribution generator 112 sends from the assumed first arrangement to the n-th arrangement, and from the first distribution to the n-th distribution to the estimator 113.

The estimator 113 estimates the position where the wireless devices 200 are located based on the distributions of the propagation data sent from the distribution generator 112. First, the estimator 113 calculates a fittability with a predetermined distribution for each distribution of the propagation data (step S106). As the type of the predetermined distribution, for example, a log-normal distribution, a Rayleigh distribution, an Nakagami-m distribution, or the like can be applied. In the log-normal distribution, the probability density distribution is expressed by the following equation (1).

$$p = \frac{1}{\sqrt{2\pi\sigma^2}} \exp\left\{-\frac{(r-\bar{r})^2}{2\sigma^2}\right\} \quad (1)$$

Here, r represents received power, r bar (a symbol in which "-" is added above r) represents a mode value (which is also an average value in a log-normal distribution) of received power, and σ represents a standard deviation of r-r bar. In the Rayleigh distribution, the probability density distribution is expressed by the following equation (2).

$$p = \frac{r}{\sigma^2} \exp\left\{-\frac{r^2}{2\sigma^2}\right\} \quad (2)$$

Here, r represents received power and σ represents a mode value of the parameter. In the median m distribution, the probability density distribution is expressed by the following equation (3).

$$f(r) = \frac{2m}{\Omega^m \Gamma(m)} r^{2m-1} \exp\left\{-\frac{m}{\Omega} r^2\right\} \quad (3)$$

Here, r is the received power, $\Gamma(m)=(m-1)!$, $\Omega=\langle r^2 \rangle$, and m is a numerical value representing a state of the propagation path, and when m is small, a multipath rich propagation path is represented, and when m is large, a propagation path that is greatly affected by direct waves is represented. Note that the predetermined distribution may be a Gaussian distribution, an exponential distribution, a Weibull distribution, an Nakagami-Rician distribution, or the like.

Figure 12:
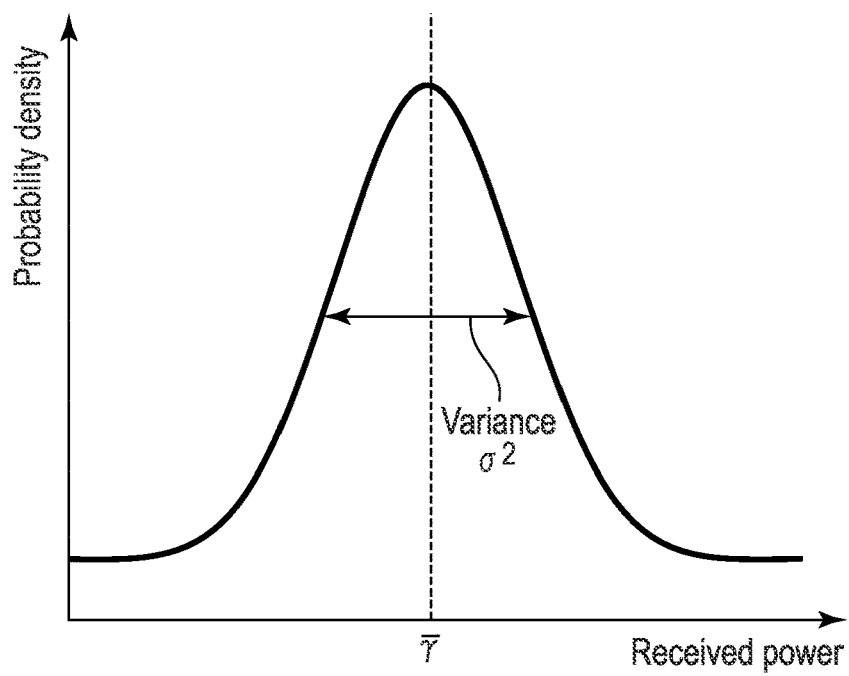
FIG. 12 is a diagram showing a log-normal distribution.
Figure 13:
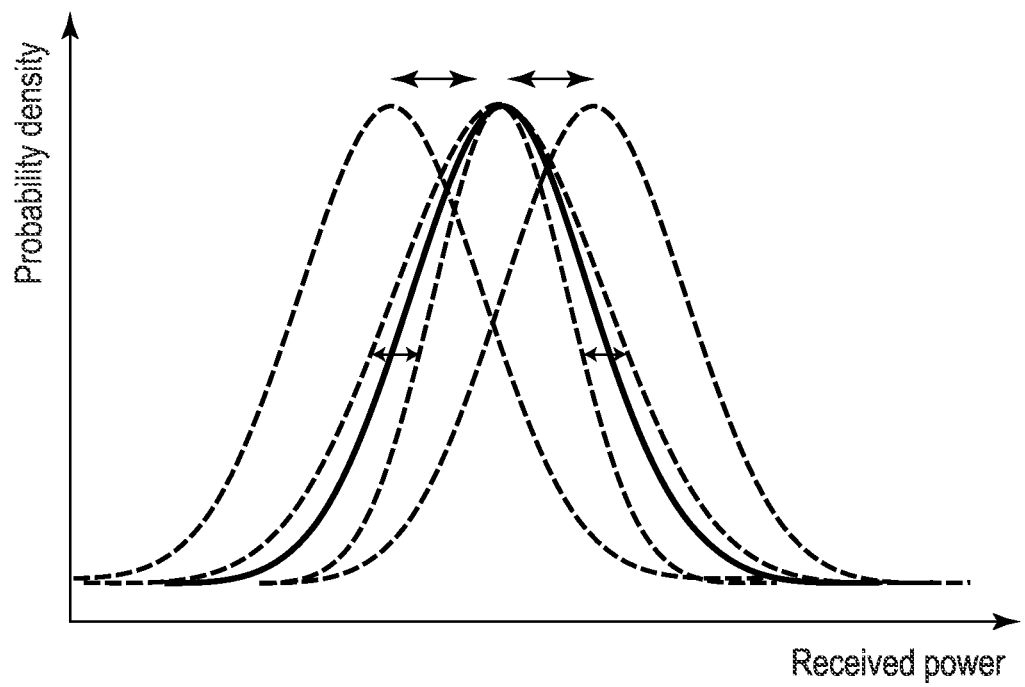
FIG. 13 is a diagram showing adjustment of an outline of the log-normal distribution.

FIG. 12 shows a log-normal distribution as an example of the predetermined distribution. Further, an outer shape of the predetermined distribution can be adjusted by adjusting parameters. FIG. 13 shows the adjustment of the outer shape of the log-normal distribution. The outer shape of the log-normal distribution can be adjusted using the mode r bar and the variance $\sigma^2$ as parameters.

When calculating the fittability between the distribution of the propagation data sent from the distribution generator 112 and the predetermined distribution, the estimator 113 adjusts the predetermined distribution so as to increase the fittability with the distribution of the propagation data. The fittability will be described in detail later. The estimator 113 calculates, for the distribution of propagation data, a fittability between the distribution of propagation data and a predetermined distribution for each virtual distance.

Figure 14:
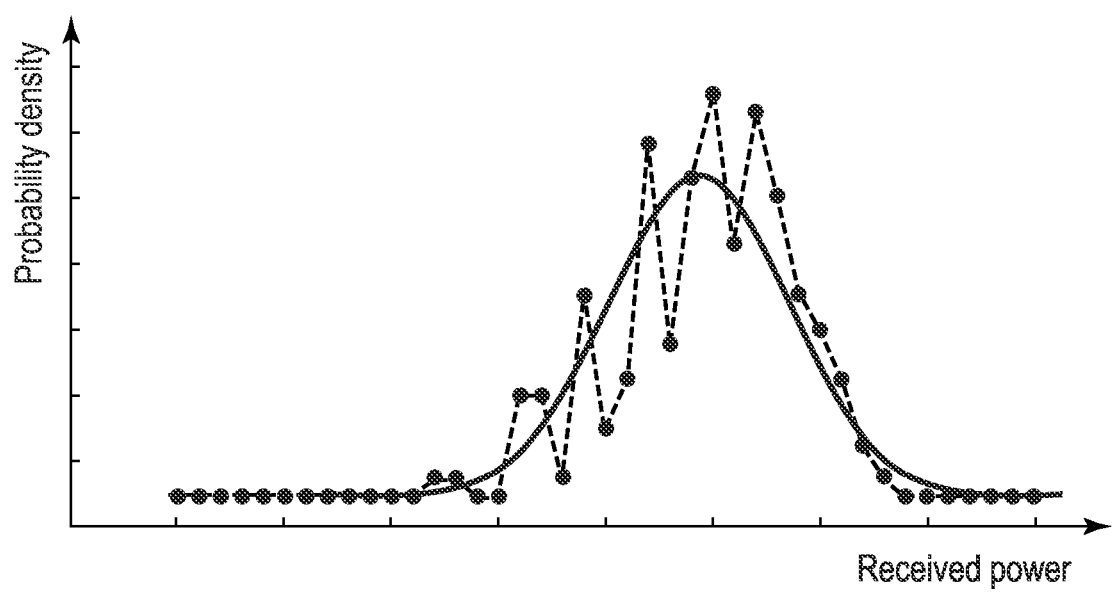
FIG. 14 is a diagram showing a distribution of propagation data in a virtual distance D1 of a first distribution and an adjusted log-normal distribution.
Figure 15:
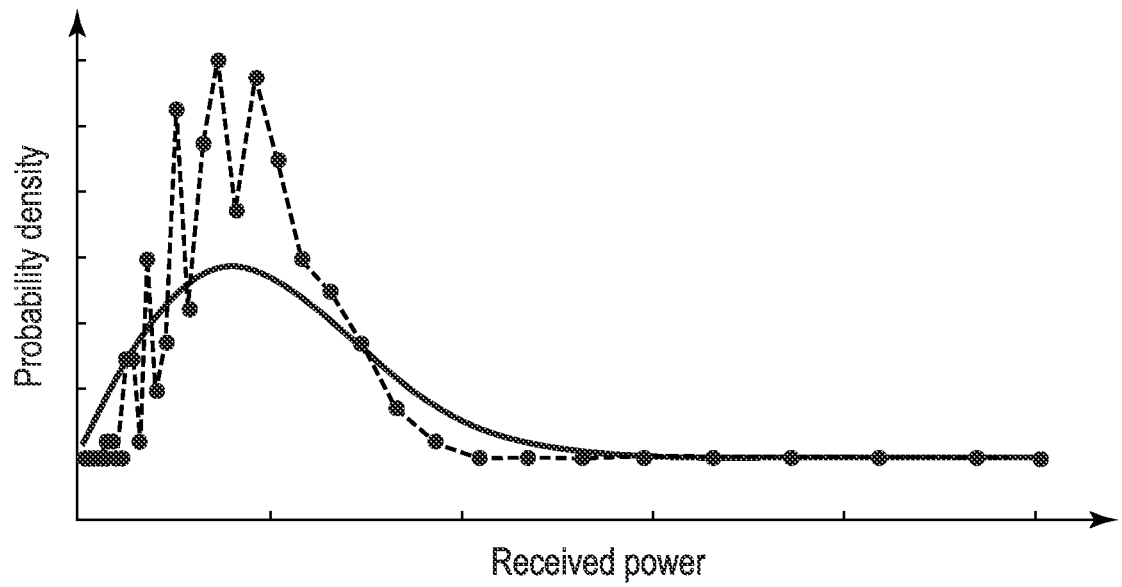
FIG. 15 is a diagram showing the distribution of propagation data in a virtual distance D1 of a first distribution and an adjusted. Rayleigh distribution.
Figure 16:
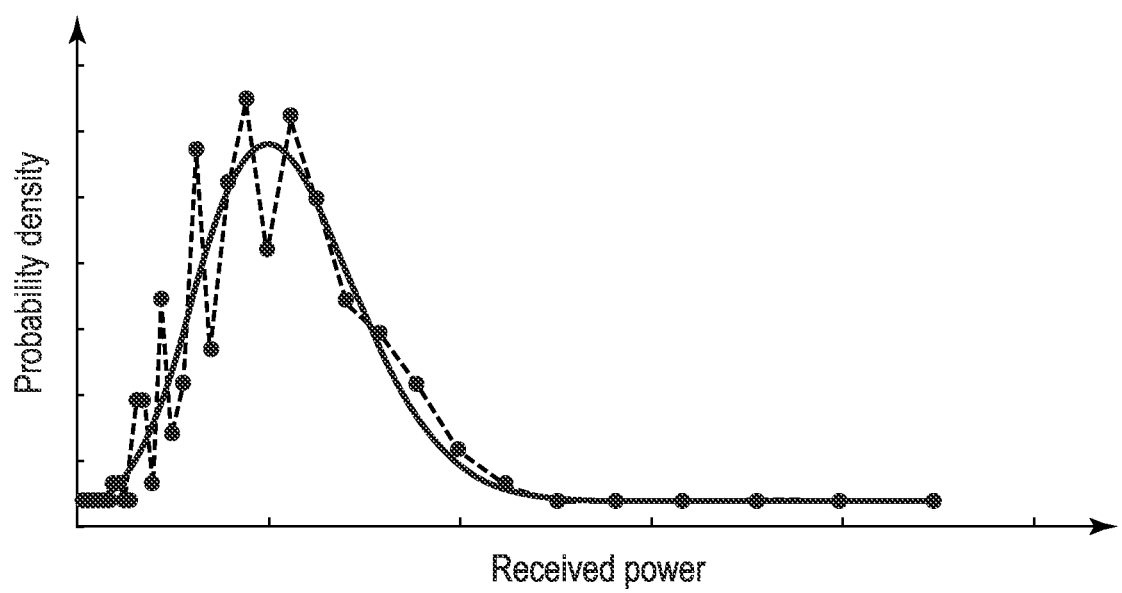
FIG. 16 is a diagram showing the distribution of propagation data in the virtual distance D1 of the first distribution and the adjusted Nakagami-m distribution.

FIG. 14 shows the distribution of the propagation data in the virtual distance D1 of the first distribution and the adjusted log-normal distribution, FIG. 15 shows the distribution of the propagation data in the virtual distance D1 of the first distribution and the adjusted Rayleigh distribution, and FIG. 16 shows the distribution of the propagation data in the virtual distance D1 of the first distribution and the adjusted Nakagami-m distribution. In FIGS. 14 to 16, dots and a broken lines represent the distributions of propagation data, and a solid line represents the predetermined distribution. The estimator 113 selects and adjusts the predetermined distribution so as to increase the fittability with the distribution of the propagation data, and calculates the fittability. The estimator 113 calculates the fittability between the first distribution and the predetermined distribution by calculating the fittability for each of the virtual distances D1 to DM of the first distribution. Hereinafter, the fittability between the first distribution and the predetermined distribution is also referred to as a first fittability, . . . , and the fittability between the n-th distribution and the predetermined distribution is also referred to as an n fittability. The estimator 113 calculates the fittability between each from the first distribution to the n-th distribution and the predetermined distribution in the same manner as described above.

The fittability will be described below. The estimator 113 calculates a deviation between the distribution of propagation data and the predetermined distribution for each received power, and evaluates the fittability by the sum of the deviations. The smaller this deviation is, the more the distribution of the propagation data conforms to the predetermined distribution (the fittability is high). For example, Table 1 is a table showing the calculation of the sum of deviations in the case where the distribution of propagation data is generated for each 1 dBm of the received power.

TABLE 1

| RSSI [dBm] | −60 | −59 | −58 | ... | −61 + K | sum |
|---|---|---|---|---|---|---|
| Measurement value PDF (frequency) | x1 | x2 | x3 | ... | xK | ΣxK |
| Theoretical value of a predetermined distribution PDF (frequency) | z1 = y1 × ΣxK/ΣyK | z2 = y2 × ΣxK/ΣyK | z3 = y3 × ΣxK/ΣyK | ... zK = yK × ΣxK/ΣyK | ΣyK × ΣxK/ΣyK |
| Deviation | (x1 − z1)²/z1 | (x2 − z2)²/z2 | (x3 − z3)²/z3 | ... | (xK − zK)²/zK | |
| Sum of deviations | | | χ² = (x1 − z1)²/z1 + . . . + (xK − zK)²/zK | | | |

K is any integer. For example, when the sum of deviations is calculated from −60 dbm to −20 dbm in increments of 1 dbm for the received power, K=41. Here, x1 to xK in the table represent frequencies in the case where the measured received power is made into a frequency distribution. The "frequency" of the frequency distribution indicates the number of times that something happens within a particular period of time. As an example, in the present embodiment, y1 to yK representing frequencies in the case where received power is measured in increments of 1 dBm represent frequencies in the case where theoretical received power in the predetermined distribution of received power is made into a frequency distribution, and z1 to zK represent values obtained by standardizing y1 to yK so that the sum of y1 to yK is the same as the sum of x1 to xK. The sum of the deviations is represented by $\chi$ (chi)$^2$.

In the evaluation of $\chi^2$, the estimator 113 uses rejection of a null hypothesis as a fittability test of $\chi^2$ as an example. In rejection of the null hypothesis, $\chi^2$ is compared with a predetermined value determined by the rejection condition (here, represented as $\chi_0^2$), and if $\chi2$ is smaller than $\chi_0^2$, the estimator 113 evaluates that the distribution of the propagation data fits the predetermined distribution (the fittability is equal to or greater than a certain level). If $\chi^2$ is greater than $\chi_0^2$, the estimator 113 evaluates that the distribution of the propagation data and the predetermined distribution do not match (the fittability is less than a certain value). By rejection of the null hypothesis, the estimator 113 can recognize that the assumed arrangement is incorrect in an arrangement in which the distribution of the propagation data does not fit the predetermined distribution.

As an example, FIG. 1.7 illustrates an example of the fittability in a case where the average value (r bar) of the received power is moved as a parameter with respect to the distribution of the propagation data associated with each of the virtual distances D1 to D3 of the first distribution, and the predetermined distribution. A black circle represents the fittability between the distribution of the propagation data in the virtual distance D1 and the predetermined distribution, a black square (black x mark) represents the fittability between the distribution of the propagation data in the virtual distance D2 and the predetermined distribution, and a black triangle represents the fittability between the distribution of the propagation data in the virtual distance D3 and the predetermined distribution. It can be seen from FIG. 17 that the fittability between the distribution of propagation data at each virtual distance and the predetermined distribution varies when the predetermined distribution is moved by the average value of received power as a parameter. FIG. 18 represents an example of the fittability in a case where the distribution of the propagation-data associated with each of the virtual distances D1 to D3 of the first distribution and the predetermined distribution are moved using the variance $\sigma^2$ as a parameter. The black circle, the black square, and the black triangle are the same as those in FIG. 17. As illustrated in FIGS. 17 and 18, the estimator 113 adjusts the parameter of the predetermined distribution so as to increase the fittability (decrease $\chi^2$), and calculates the fittability between the distribution of the propagation data and the predetermined distribution. When $\chi^2$ is larger than $\chi_0^2$, the estimator 113 may delete the assumed arrangement as being incorrect.

The fittability has been described above. The estimator 113 calculates the fittability for each virtual distance, and calculates the fittability of the distribution. As an example, in the present embodiment, the estimator 113 calculates $\chi^2$ for each virtual distance, and calculates the sum of $\chi^2$ as the fittability of the distribution. Alternatively, the estimator 113 may multiply $\chi^2$ for each virtual distance or may calculate an evaluation value of the fittability as the fittability of the distribution by multiplying a coefficient or substituting the evaluation value into a function. In this embodiment, since the log-normal distribution is used as the predetermined distribution, the average value (r bar) and the variance $\sigma^2$ of the received power are used as parameters. When another distribution is used as the predetermined distribution, a parameter capable of adjusting the outer shape of the distribution is appropriately used.

Figure 19:
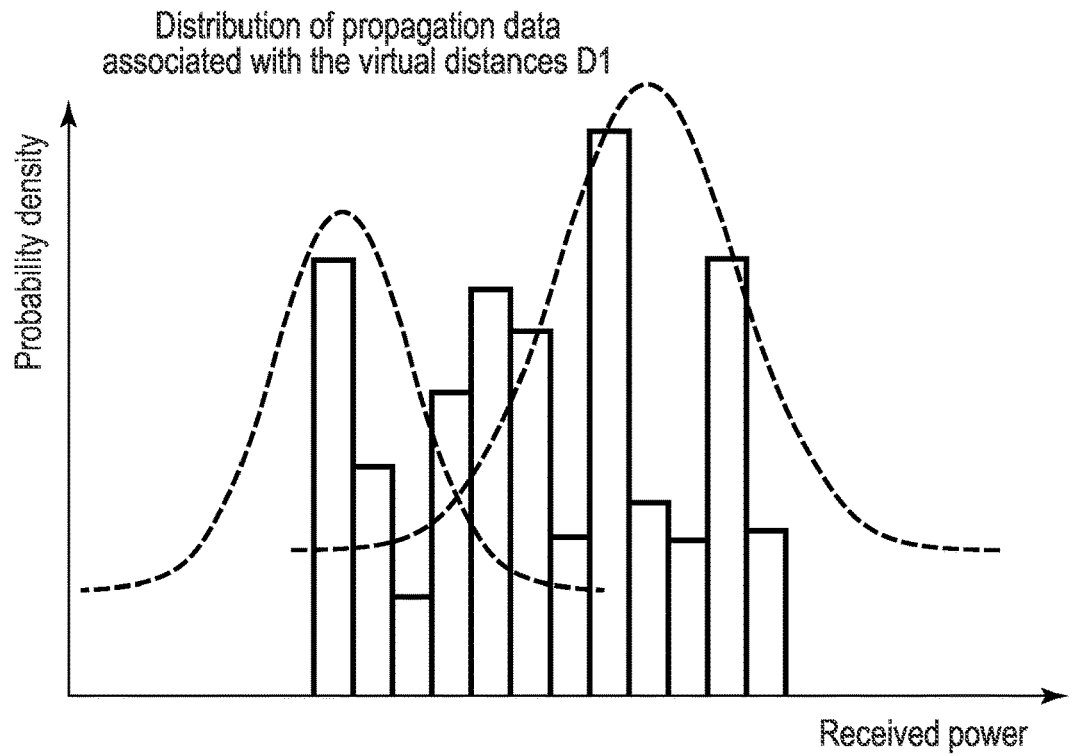
FIG. 19 is a diagram showing an example of the distribution of the propagation data of the virtual distances D1 and a predetermined distribution in a wrong arrangement.

FIG. 19 shows an example of the distribution of the virtual distances D1 in a wrong arrangement and the predetermined distribution. In the wrong arrangement, the distribution of propagation data for each virtual distance does not fit to the predetermined distribution. For example, FIG. 19 shows that the distribution of the propagation data does not fit to the predetermined distribution even if the outer shape of the predetermined distribution is adjusted. In this way, if the arrangement is wrong, a wrong virtual distance is associated with the propagation data, and thus the distribution of the propagation data does not fit to the predetermined distribution, and the estimator 113 can recognize that the assumed arrangement is wrong.

The estimator 113 compares the calculated fittabilities and estimates the positions where the wireless devices 200 are located (step S107). The estimator 113 estimates the arrangement of the wireless devices 200 in the distribution of the highest fittability from the first fittability to the n-th fittability as the position where the wireless devices 200 are located. In the present embodiment, as an example, the first fittability of the first arrangement is the highest fittability, the estimator 113 estimates the first arrangement as the position where the wireless devices 200 are located. From the first distribution to the n-th distribution, in the first distribution and the other distribution (assumed to be a second distribution), the estimator 113 compares the first fittability and a fittability between the second distribution and a predetermined distribution (hereinafter, also referred to as a second fittability), and estimates an arrangement of the wireless devices 200 in a distribution having a higher fittability as positions where the wireless devices 200 are located. In the case of the present embodiment, since the first fittability is higher than the second fittability, the estimator 113 estimates the first arrangement as the positions where the wireless devices 200 are located. The estimator 113 sends information indicating the estimated positions where the wireless devices 200 are located to the outputter 103.

Figure 20:
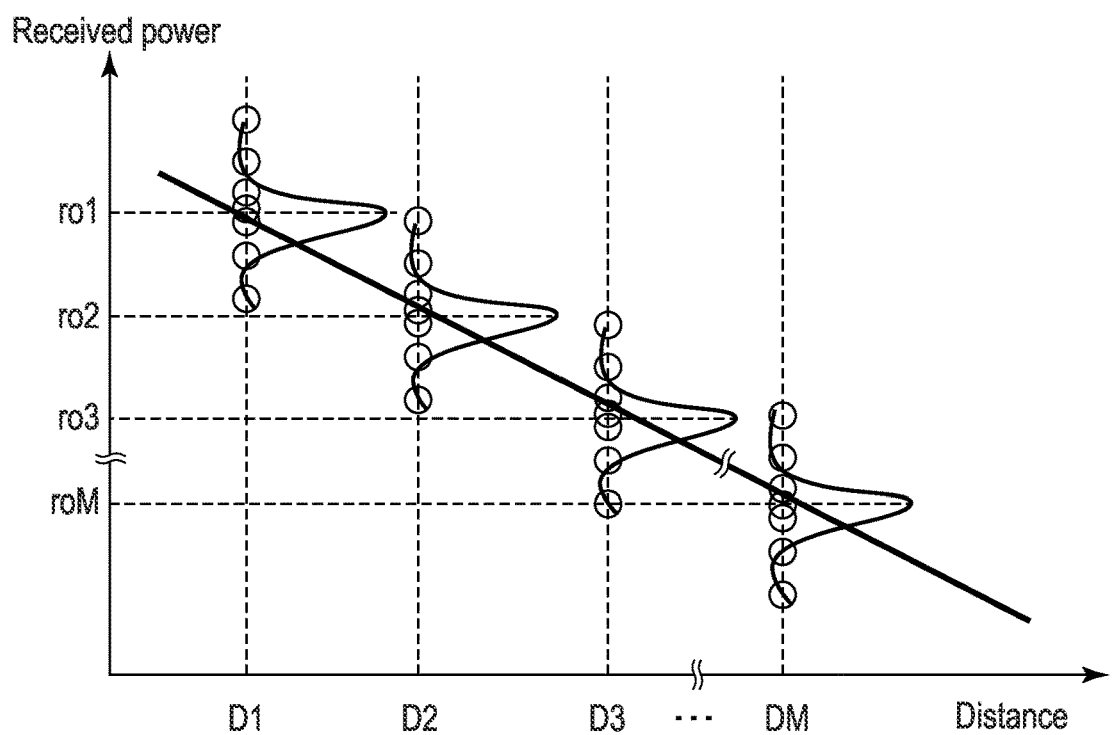
FIG. 20 is a diagram showing an example of tendencies of virtual distances and received power in a correct arrangement.

FIG. 20 shows an example of tendency of the virtual distance and the received power in the correct arrangement. Circles in FIG. 20 represent propagation data associated with each virtual distance, and a figure drawn for each virtual distance represents a predetermined distribution fitting the distribution of the propagation data. The received power at the vertex of the distribution represents a mode of the received power for each fitting predetermined distribution. As illustrated in FIG. 20, in the correct arrangement, there is a tendency that the mode value of the received power for each fitting predetermined distribution decreases as the virtual distance increases. This also corresponds to the relationship between the received power and the distance between the wireless devices 200. Therefore, if there is a predetermined distribution that fits the distribution of the propagation data for each virtual distance, the mode value of the received power for each fitting predetermined distribution tends to decrease as the virtual distance increases, and a possibility of the correct arrangement becomes high.

The outputter 103 outputs the information indicating the positions where the wireless devices 200 are located sent from the estimator 113 to the output destination (step S108). When the information indicating the positions where the wireless devices 200 are located is stored in the storage 102, the controller 111 may cause the storage 102 to store the information. The controller 111 may extract the information indicating the positions of the wireless devices 200 from the storage 102 and send the information to the outputter 103 as necessary, and the outputter 103 may output the information to the output destination.

The controller 111 checks whether or not an end command for terminating the operation of the estimation apparatus 100 is arrived (step S109). The end command is a command to end the operation of the estimation apparatus 100 in this flow. The end command is sent to the controller 111 by being input to the estimation apparatus 100 by a user, by the estimation apparatus 100 acquiring a signal including the end command, or the like. The end command may be a command to immediately end the operation of the estimation apparatus 100.

If the end command is not arrived at the controller 111 (step S109: No), the process returns to step S101. If there is no change in the position candidate information, the process may return to step S102. On the other hand, when the end command is arrived at the controller 111 (step S109: Yes), the flow ends, and the estimation apparatus 100 ends the operation. After returning to step S101 or S102, the estimation apparatus 100 may perform the operation of this flow again under predetermined condition. When the flow returns, the controller 111 may delete from the first communication information to the N-th communication information from the storage 102, when from the first communication information to the N-th communication information are used for the estimation of positions of the wireless devices 200 a predetermined number of times (for example, once).

The estimation apparatus 100 according to the present embodiment has been described above. The estimation apparatus 100 described in the present embodiment is an example, and various modifications can be implemented and executed. Hereinafter, reference examples and modifications of the communication system 300 including the estimation apparatus 100 will be described.

Reference Example

In the present embodiment, it has been described that the first propagation path to the N-th propagation path are different from each other in at least one of airflow between communicating wireless devices 200, a frequency band used in communication between wireless devices 200, a type of electromagnetic wave (for example, polarized wave) used in communication between wireless devices 200, an antenna used in communication between wireless devices 200, a time period during which communication between wireless devices 200 is performed, presence/absence or level of vibration generated in communicating wireless devices 200, or directivity of a signal in communication between wireless devices 200. In the reference example, these matters will be described with reference to the drawings.

Figure 21:
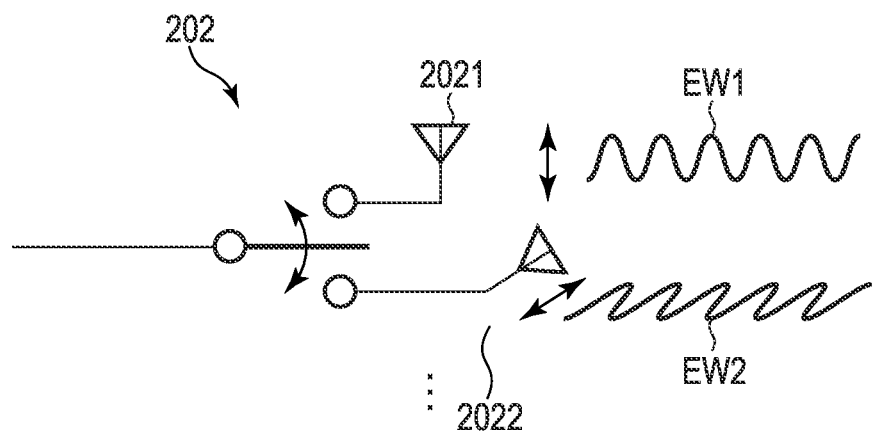
FIG. 21 is a diagram illustrating a case where types of electromagnetic waves used in communication between the wireless devices 200 are different.

FIG. 21 illustrates a case where different types of electromagnetic waves are used for communication between the wireless devices 200. As types of electromagnetic waves, FIG. 21 shows a case where the antenna unit 201 radiates a vertically polarized wave and a case where the antenna unit 201 radiates a horizontally polarized wave. As an example, the antenna 2021 radiates vertically polarized EW1 and the antenna 2022 radiates horizontally polarized waves. The polarized wave to be radiated may be changed for each antenna, or may be radiated while switching an antenna capable of radiating a plurality of types of polarized waves.

Figure 22:
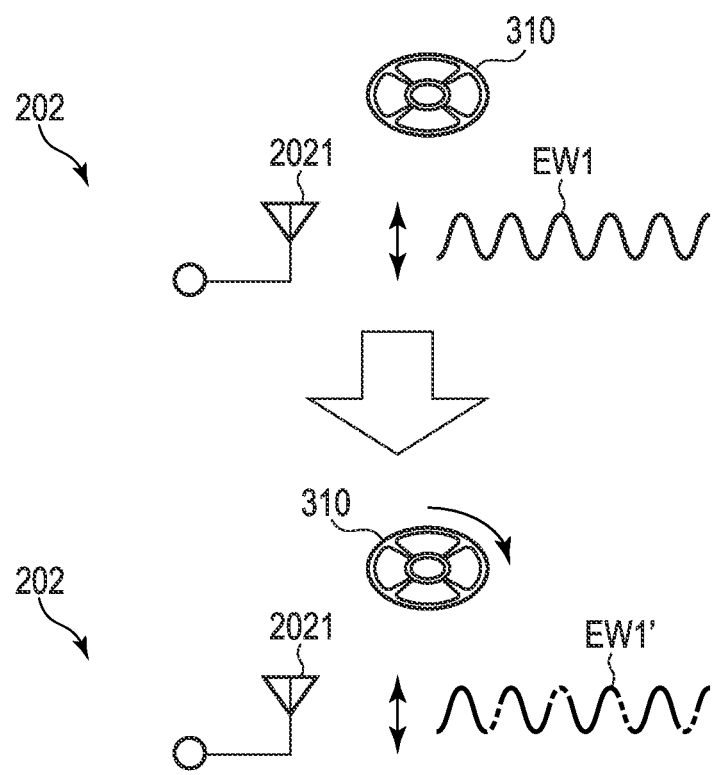
FIG. 22 is a diagram illustrating a case where airflows between the wireless devices 200 are different.

FIG. 22 illustrates a case in which airflows between the wireless devices 200 performing communication are different. It is assumed that the communication system 300 is provided with a fan 310 for stirring an airflow. In this case, even if the same antenna 2021 radiates an electromagnetic wave, propagation characteristics of the electromagnetic waves EW1 and EW1' may change depending on the presence or absence of airflow or the presence or absence of the driving of the fan. In addition, the propagation characteristics of the electromagnetic waves EW1 and EW1' may change due to reflection of the electromagnetic waves on the blades of the driven fan. Therefore, propagation paths are different depending on the presence or absence of airflow or the presence or absence of driving of the fan. Note that propagation paths may be different depending on not only the presence or absence of the airflow but also at least one of the strength (level) of the airflow, or the strength (number of rotations) of the fan to be driven.

Figure 23:
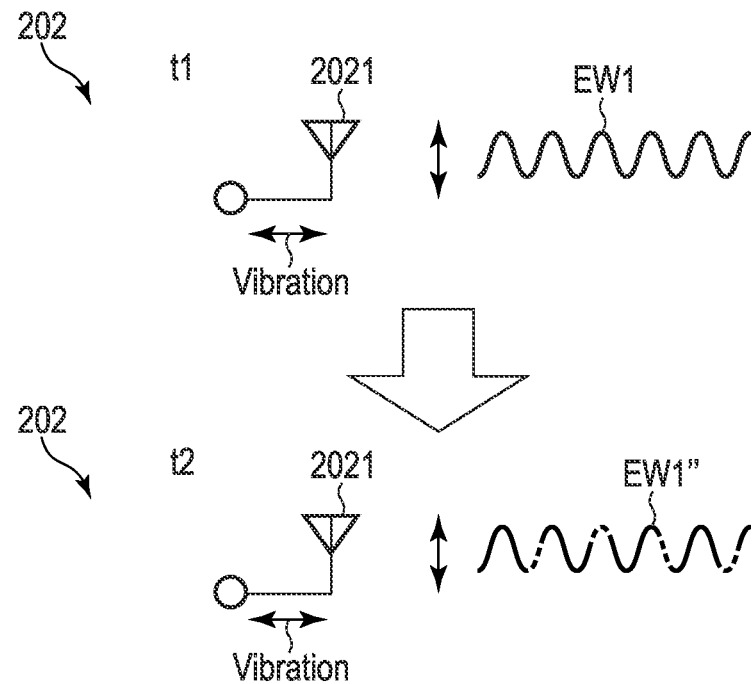
FIG. 23 is a diagram illustrating a case where presence or absence of vibration or level of vibration generated in the wireless device 200 are different.

FIG. 23 illustrates a case where the presence or absence of vibration and the level of vibration generated in the wireless device 200 performing communication are different. In the communication system 300, in an environment in which vibration occurs steadily or non-steadily, the propagation characteristics of an electromagnetic wave to be radiated may change in accordance with the vibration. FIG. 23 shows that the electromagnetic wave EW1 is radiated at the time t1 and the electromagnetic wave EW2" is radiated at the time t2 when the wireless device 200 on the transmission side vibrates. In this way, propagation paths may be different depending on the presence or absence of vibration and the level of vibration.

Figure 24:
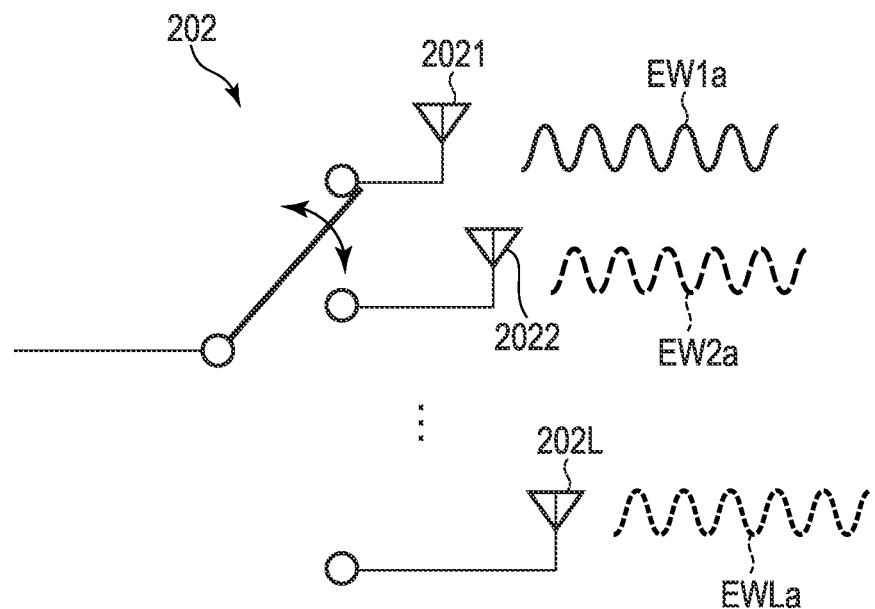
FIG. 24 is a diagram illustrating a case where antennas used for communication performed by the wireless device 200 are different.

FIG. 24 illustrates a case where antennas used for communication between the wireless devices 200 are different. When the antennas are different, the propagation characteristics of the radiated electromagnetic wave may change. In FIG. 24, antennas 2021 to 202L radiate electromagnetic waves EW1a to EWLa, respectively. In this way, propagation paths may be different for different antennas.

Figure 25:
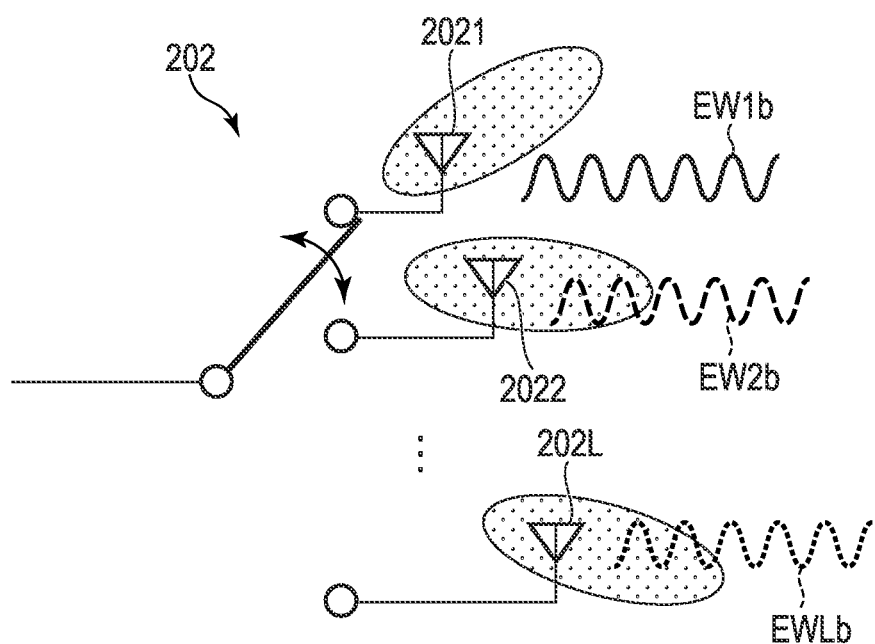
FIG. 25 is a diagram illustrating a case where directivities of signals in communication between the wireless devices 200 are different.

FIG. 25 illustrates a case where the directivity of a signal in communication between the wireless devices 200 is different. In the case of an antenna capable of changing the directivity of an electromagnetic wave (signal) to be radiated, the propagation characteristics of the electromagnetic wave to be radiated may change depending on the directivity. In FIG. 25, antennas 2021 to 202L radiate electromagnetic waves EW1b to EWLb, respectively. The figure overlaid on the antenna represents the directivity. In this way, propagation paths may be different depending on the directivity.

The cases of FIGS. 21 to 25 have been described above. The same applies to not only the wireless device 200 on the transmission side but also the wireless device 200 on the reception side. For example, since propagation characteristics may be different depending on the antenna of the wireless device 200 on the reception side or the directivity of reception, propagation paths may be different.

(First Modification)

In the present embodiment, estimation apparatus 100 gathers the first propagation data to the N-th propagation data and generates the distribution of the propagation data for each assumed arrangement. Here, depending on the virtual distance, there is a possibility that the amount of propagation data is small in generating the distribution of propagation data. For example, in the position candidates illustrated in FIG. 9, the number of pieces of propagation data associated with the virtual distances D1 and D3 is larger than the number of pieces of propagation data associated with the virtual distances DM. As the number of pieces of propagation data increases, it is possible to reduce an influence of the propagation characteristics and deviation.

In the present modification, estimation apparatus 100 corrects propagation data associated with different virtual distances and adds to generate the distribution of the propagation data. As a result, it is possible to reduce the influence of propagation characteristics and the deviation.

FIG. 26 is a detailed flowchart of step S105' in the present modification. In this modification, step S105 in the flowchart described with reference to FIG. 4 is replaced with step S105'. Note that, in the present modification example, description will be made focusing on the first arrangement among the first arrangement to the n-th arrangement, but the same applies even when focusing on another arrangement.

The distribution generator 112 generates the distribution of the propagation data for each of the virtual distances between the wireless devices 200 in the assumed arrangement based on the first propagation data to the N-th propagation data (step S1051). This is the same as step S105, but the following description will focus on the distribution of the propagation data in the first arrangement (the first distribution). Hereinafter, the distribution of propagation data generated for each virtual distance is also referred to as a sub-distribution. As in the present embodiment, when the virtual distances are D1 to DM, the sub-distribution is a first sub-distribution to an M-th sub-distribution, and the first distribution includes the first sub-distribution to the M-th sub-distribution. Since a plurality of sub-distributions are required, M is an integer equal to or greater than 2 in this modification. The generated sub-distribution is sent to the estimator 113.

The estimator 113 calculates a mode value for each sub-distribution of the generated propagation data (step S1052). The estimator 113 determines a predetermined distribution fitting each sub-distribution, similarly to the step S106 described in the present embodiment. Since the method of determining the predetermined distribution has been described in the present embodiment, a description thereof will be omitted. The estimator 113 calculates mode value of a fitting predetermined distribution. For example, the estimator 113 calculates from a mode value of a predetermined distribution that fits the first sub-distribution, to a mode value of a predetermined distribution that fits the M-th sub-distribution. Hereinafter, the predetermined distribution that fits the first sub-distribution is also referred to as a first predetermined distribution, . . . , the predetermined distribution that fits the M-th sub-distribution is also referred to as an M-th predetermined distribution, the mode value of the first predetermined distribution is also referred to as a first mode value, and the mode value of the M-th predetermined distribution is also referred to as an M-th mode value. The estimator 113 transmits the calculated the first mode value to the M-th mode value to the distribution generator 112.

Figure 27:
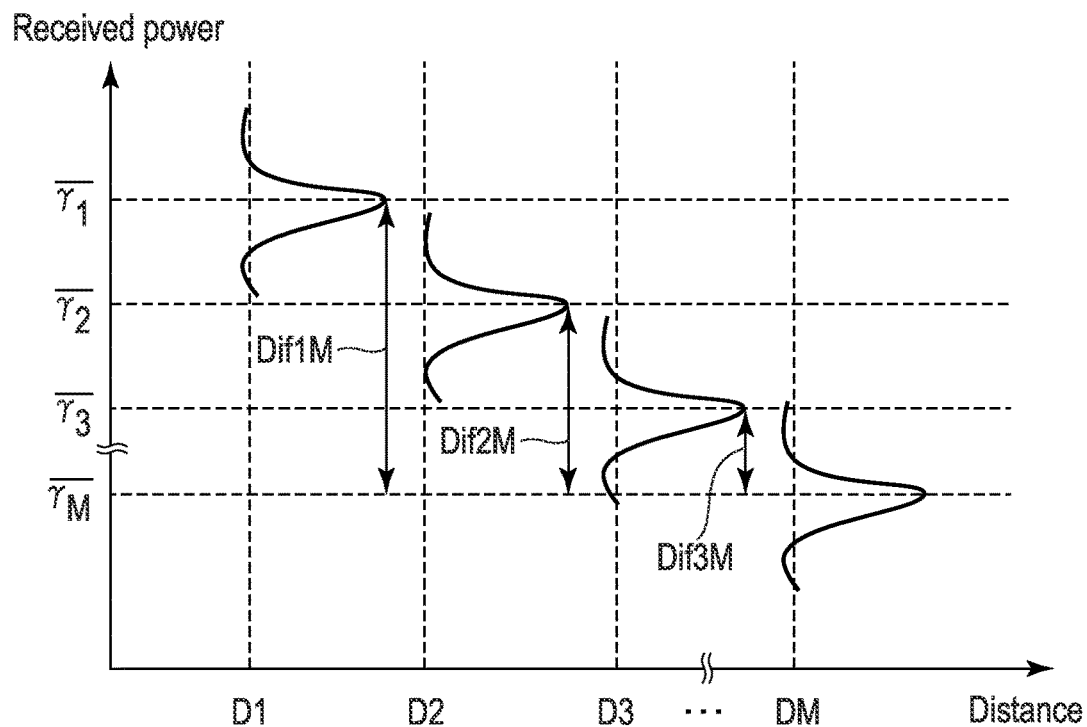
FIG. 27 is a diagram illustrating an example of a difference between mode values.

The distribution generator 112 calculates a difference between a mode value of a predetermined distribution in the target virtual distance and a mode value of a predetermined distribution in the virtual distance to be corrected (step S1053). FIG. 27 is a diagram illustrating an example of a difference between mode values in this modification, as an example, the distribution generator 112 corrects propagation data associated with virtual distances other than the virtual distance DM, and generates the M-th distribution from the propagation data associated with the virtual distance DM and corrected propagation data. In this case, the predetermined distribution in the target virtual distance is the M-th predetermined distribution, and the mode value thereof is the M-th mode value. The predetermined distribution in the virtual distance to be corrected is at least one of the first to (M−1)-th predetermined distribution. The mode values of the first to (M−1)-th predetermined distribution are the first mode value to the (M−1)-th mode value, respectively.

In the present modification, as an example, first to third predetermined distributions are used as the predetermined distributions in the virtual distance to be corrected. In FIG. 27, the differences between the first mode value and the M-th mode value, the second mode value and the M-th mode value, and the third mode value and the M-th mode value are represented as Dif1M, Dif2M, and Dif3M, respectively.

The distribution generator 112 corrects the first to N-th propagation data associated with the virtual distances to be corrected based on the difference between the mode values calculated in step S1053 (step S1054). In the present modification, since the virtual distances to be corrected are D1 to D3, the distribution generator 112 corrects the first to N-th propagation data associated with the virtual distance D1 by Dif1M, the first to N-th propagation data associated with the virtual distance D2 by Dif2M, and the first to N-th propagation data associated with the virtual distance D3 by Dif3M. In the present modification example, the distribution generator 112 corrects so as to be smaller, but may correct so as to be larger depending on a target virtual distance.

Figure 28:
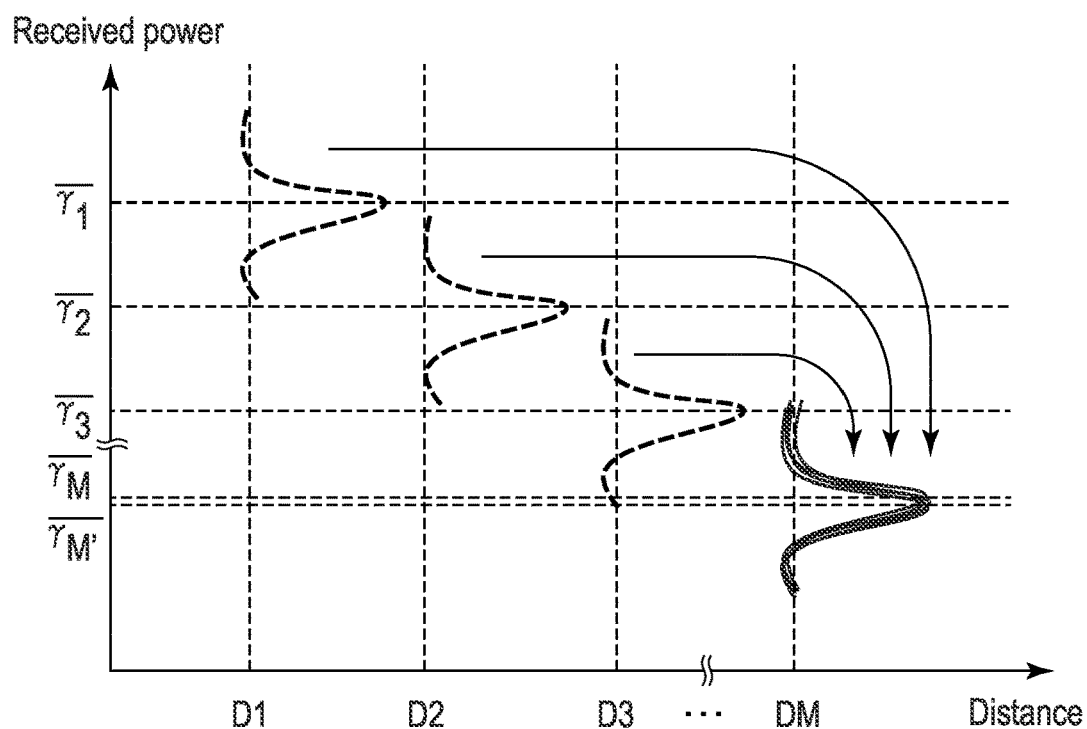
FIG. 28 is an image diagram illustrating re generation of a M-th sub-distribution.

The distribution generator 112 generates a sub-distribution of the propagation data at a target virtual distances based on the first to N-th propagation data and the corrected first to N-th propagation data (step S1055). In this modification example, since the target virtual distance is the virtual distance DM, the distribution generator 112 adds from the corrected first to N-th propagation data associated with the virtual distance D1 to D3 and to the first to N-th propagation data associated with the virtual distance DM and re-generates the M-th distribution based on the added propagation data. FIG. 28 is an image diagram showing re-generation of the M-th sub-distribution. As the propagation data used for re-generating the M-th sub-distribution increases, the M-th sub-distribution may change and the predetermined distribution fitting the re-generated M-th sub-distribution may change. In FIG. 28, before the re-generation of the M-th sub-distribution is performed, the mode value of the predetermined distribution fitting the M-th sub-distribution is represented by $r_M$ bar, but after the re-generation of the M-th sub-distribution is performed, the mode value of the re-generated predetermined distribution is represented by $r_M'$ bar.

Step 3105' has been described above. Through step S105', the estimation apparatus 100 generates a sub-distribution of propagation data assuming a first distance between wireless devices 200 in a certain arrangement (for example, a first arrangement) based on the first to N-th propagation data, and generates a sub-distribution of propagation data assuming a second distance between wireless devices 200 based on the first to N-th propagation data and the sub-distribution of propagation data assuming the first distance between wireless devices 200. The first distance corresponds to a virtual distance to be corrected, and the second distance corresponds to a target virtual distance.

Although the target virtual distance is the virtual distance DM in the present modification, another virtual distance or a plurality of distances may be used as target virtual distances. The estimation apparatus 100 may add propagation data for all virtual distances while switching between a target virtual distance and a virtual distance to be corrected, and generate a sub-distribution based on the added propagation data.

(Second Modification)

In the embodiment, in the generation of the distribution of propagation data for each arrangement, the distribution is generated for all virtual distances. In the present modification, a case will be described in which a distribution of propagation data is generated for each arrangement by generating a distribution for a part of virtual distances.

An operation of the estimation apparatus 100 is substantially the same as that of the flowchart described with reference to FIG. 4, but different points will be described below. In step S105, the distribution generator 112 generates a distribution of propagation data in an assumed arrangement for a predetermined virtual distance based on the first to N-th propagation data. In addition, in step S106, the estimator. 113 calculates the fittability between the distribution of propagation data at the predetermined virtual distance and a predetermined distribution.

The predetermined virtual distance may be determined in various ways. For example, the distribution of propagation data may be generated for virtual distances for which the associated propagation data exceeds a predetermined amount. Further, in communication between the wireless devices 200, a range of distances in which the distribution of propagation data is likely to follow a predetermined distribution may be measured in advance, and the distribution of propagation data may be generated for virtual distances within the range of distances. By using a predetermined amount of propagation data as a requirement for generating the distribution of propagation data, it is possible to reduce the influence of an outlier or deviation of propagation characteristics. In addition, by setting a requirement for generating the distribution of the propagation data to be a virtual distance within a distance range in which the distribution of the propagation data is likely to follow a predetermined distribution, it is possible to increase the accuracy of estimating the positions where the wireless devices 200 are located based on the fittability.

(Third Modification)

Hereinafter, a modification example in which a function of the estimation apparatus 100 is realized by a program will be described. The function performed by the components of the estimation apparatus 100 may be realized by a processing device similar to the processor 110 processing a program. The program may be provided by being stored in a computer-readable storage medium such as a CD-ROM, a memory card, a CD-R, and a digital versatile disk (DVD) as a file in an installable format or an executable format. The program may be stored in a computer connected to a network such as the Internet and provided via the network, or may be provided by being incorporated in a storage medium such as a ROM, an HDD, or an SSD.

Reference examples and modified examples of the present embodiment have been described above. The reference example and the arrangement example may be combined. The estimation apparatus 100 according to the present embodiment estimates the positions where the wireless devices 200 are located from a plurality of position candidates based on position candidate information indicating candidates of the positions where the wireless devices 200 are located and first communication information in communication using a first propagation path between the wireless devices 200 to N-th communication information in communication using an N-th propagation path between the wireless devices 200. By using communication information in communication between the wireless devices 200 using a plurality of propagation paths, the accuracy of estimation of the positions of the wireless devices 200 can be improved.

Second Embodiment

Figure 29:
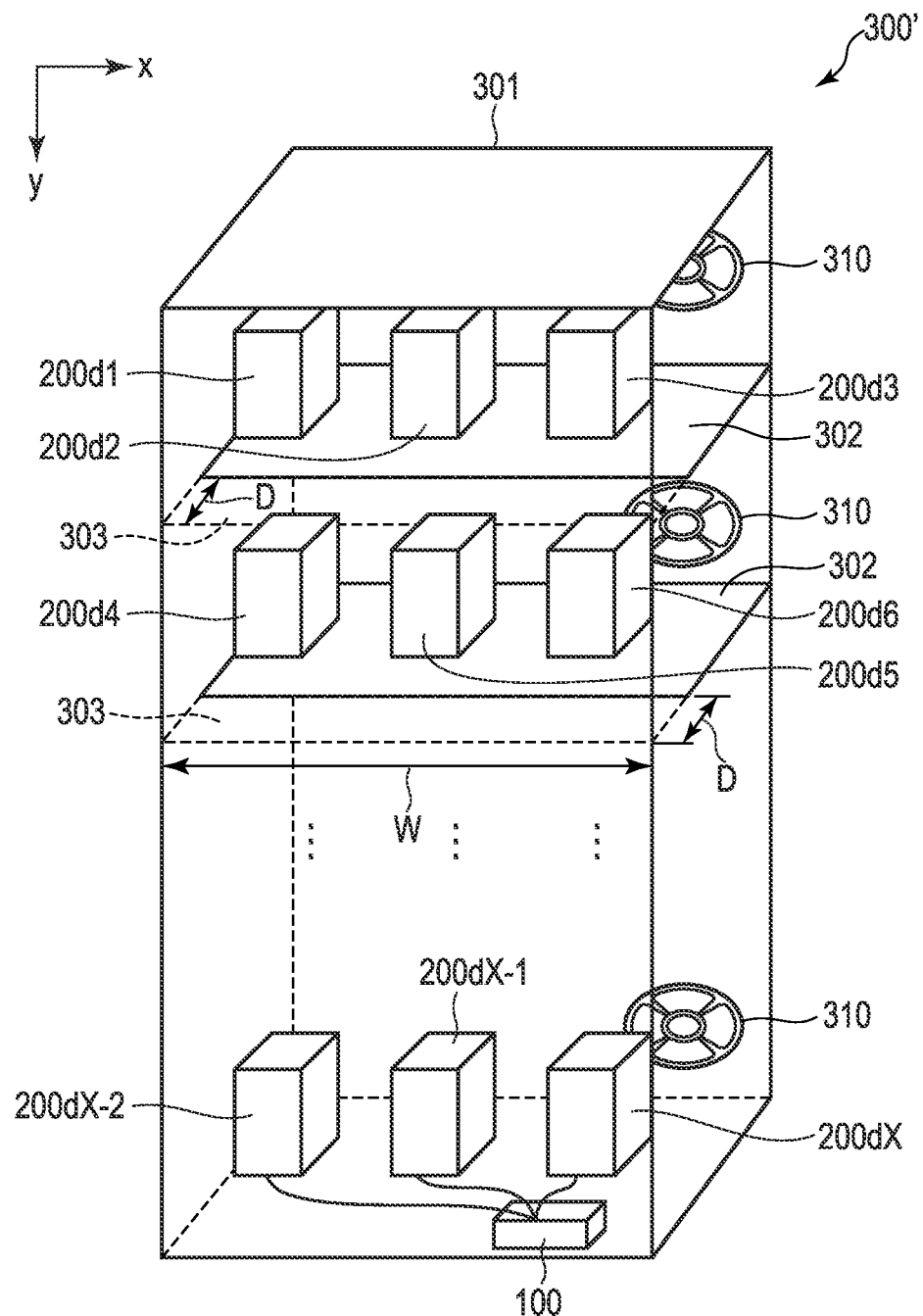
FIG. 29 is a configuration diagram of a communication system 300' according to a second embodiment.

The second embodiment describes an application example of the first embodiment. FIG. 29 is a configuration diagram of a communication system 300' according to an application example of the communication system 300. The communication system 300' includes the estimation apparatus 100, the wireless devices 200$d$1 to 200$d$X, a housing case 301, a shield (shields) 302, and a fan (fans) 310. For the sake of description, FIG. 29 visualizes the estimation apparatus 100, the wireless devices 200$d$1 to 200$d$X, the shield 302, and the fan 310, which are located inside the housing case in a partially transparent manner. The wireless devices 200$d$1 to 200$d$X, the shield 302, and the fan 310 are components to provide inside the housing case 301. The estimation apparatus 100 is provided inside the housing case 301 in FIG. 29, but may be provided outside the housing case 301. In addition, a space (spaces) 303 is formed by the housing case 301 and the shield 302. Although partially omitted in FIG. 29, the estimation apparatus 100 and the wireless device 200 are connected by a wire. This connection may be wireless.

Since the estimation apparatus 100 and the wireless devices 200$d$1 to 200$d$X are the same as those in the first embodiment, the same reference numerals are given and the description thereof is omitted. The housing case 301 is a case for providing wireless devices 200$d$1 to 200$d$X therein. Any material as the housing case 301 can be applied. For example, the material may be metal, resin, or a hybrid material thereof.

The shield 302 is provided inside the housing case 301 and partitions the inside of the housing case 301. The shield 302 supports the wireless device 200. That is, since the shield 302 is provided in the housing case 301, the shield 302 serves as a shelf for supporting the wireless device 200. Due to the shield 302, wireless devices 200 provided on different shields 302 are not linearly visible to each other and communicate via the shield 302. The material of the housing case 301 is arbitrary. For example, the material may be metal, resin, or a hybrid material thereof.

The space 303 is a region formed by providing the shield 302 inside the housing case 301. In FIG. 29, the region having a width W and a depth D is formed on a plane parallel to the surface of the shield 302. That is, the inside of the housing case 301 is not completely partitioned by the shield 302, and an open ceiling by due to the space 303 exists in a part of the inside of the housing case 301. Although the space 303 is a space in FIG. 29, the space 303 may be provided in a part of the shield 302. Further, the space 303 may be an object instead of a space. In this case, the material of the space 303 is a material that transmits electromagnetic waves more easily than the shield 302. Note that even in a case where the space 303 is provided in part of the shield 302, the space 303 is formed by the housing case 301 and the shield 302.

The fan 310 drives and stirs an air inside the housing case 301. As described with reference to FIG. 22 of the first embodiment, propagation paths can be different by stirring the airflow inside the housing case 301.

Figure 30:
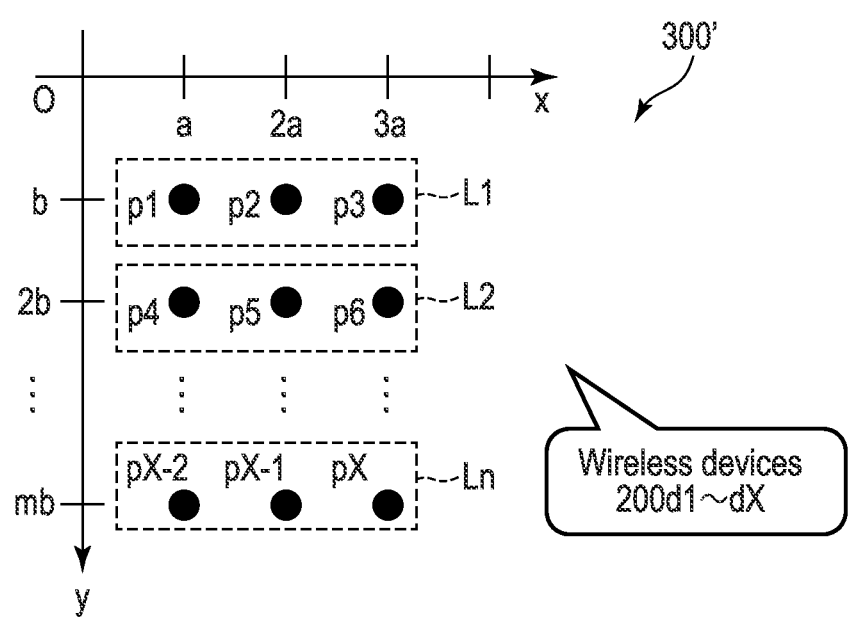
FIG. 30 is a diagram illustrating position candidates of wireless devices 200$d$1 to 200$d$X in the communication system 300'.

The components of the communication system 300' have been described above. FIG. 30 is a diagram illustrating position candidates of the wireless devices 200*d*1 to 200*d*X in the communication system 300'. In the present embodiment, the housing case 301 is partitioned by the shield 302. Hereinafter, this partitioned area is referred to as layers. In this embodiment, since the layers are set perpendicular to the y coordinate, the position candidates can be classified for each layer. For example, the position candidates p1 to p3 are in layer l1, the position candidates p4 to p6 are in layer l2, . . . , and the position candidates pX−2 to pX are in layer li (i=X/3, in the present embodiment). In the present embodiment, the wireless device 200*d*1 is located in the position candidate p1, the wireless device 200*d*2 is located in the position candidate p2, . . . , and the wireless device 200*p*X is located in the position candidate pX, but they are unknown to the estimation apparatus 100 at first point.

Figure 31:
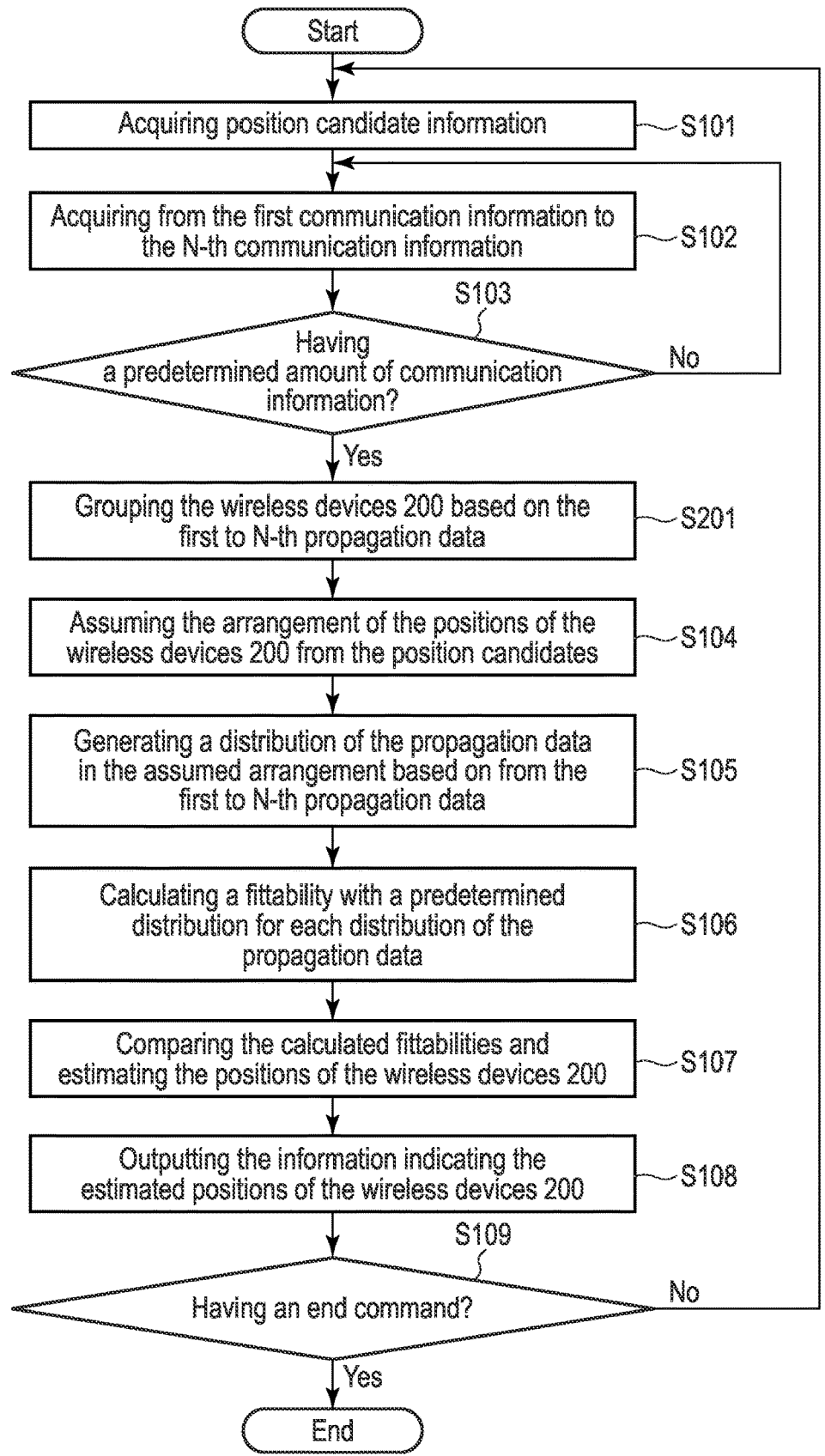
FIG. 31 is a flowchart of an estimation operation of the estimation apparatus 100 according to the second embodiment.

FIG. 31 is a flowchart of an estimation operation of the estimation apparatus 100 according to the present embodiment. Since this flowchart is similar to that of FIG. 4, the same steps are denoted by the same step numbers and description thereof is omitted.

After step S103, the distribution generator 112 groups the wireless devices 200 based on the first to N-th propagation data (step S201). As described with reference to FIG. 29, among the wireless devices 200, the wireless devices 200 arranged in different layers communicate with each other through the shield 302, and thus there is a difference in propagation data between the wireless devices 200 arranged in the same layer and different layer. For example, the received power of the wireless devices 200 arranged in different layers tends to be lower than that of the wireless devices arranged in the same layer. The distribution generator 112 groups the wireless devices 200 by using the difference in the propagation data. For example, in the present embodiment, since the number of position candidates included in each layer is three, the distribution generator 112 groups the wireless devices 200*d*1 to 200*d*X three by three. Since there are layers l1 to li, the wireless devices 200 are grouped by the same number. Here, the group of wireless devices 200 is referred to as G1 to Gi. By grouping the wireless devices 200, it is possible to reduce the number of combinations of the arrangement of the wireless devices 200 (the number of assumed arrangements). In a case where there are X wireless devices 200, the number of combinations of the arrangement of the wireless devices 200 is X. However, when three wireless devices are grouped into one group, there are 3!^(X/3) combinations of the arrangement of the wireless devices 200, and the number of combinations of the arrangement of the wireless devices 200 (the number of assumed arrangements) can be reduced. This contributes to a reduction in the load of the estimation processing and an increase in the speed of the estimation processing of the positions of the estimation apparatus 100.

Figure 32:
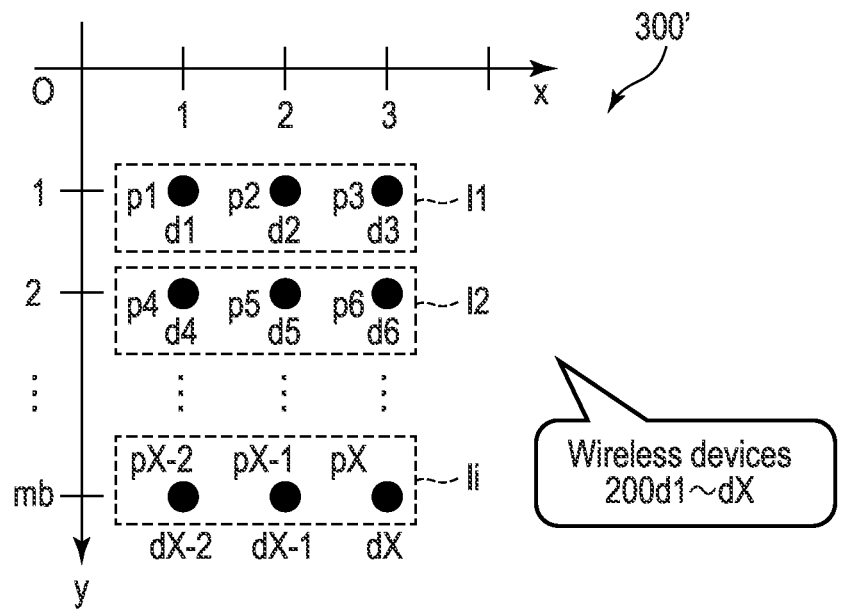
FIG. 32 is a diagram illustrating an example of the position of each of the wireless devices 200 estimated by the estimator 113 in the second embodiment.

The following description is the same as that of the first embodiment. In the present embodiment, as in the first embodiment, the estimation apparatus 100 finally estimates that the wireless device 200*d*1 is located in the position candidate p1, . . . , and the wireless device 200*d*X is located in the position candidate pX (first arrangement). FIG. 32 is a diagram illustrating the first arrangement in the present embodiment. In step S108, the outputter 103 may output the information indicating the positions where the wireless devices 200 are arranged for each group, or may output the information indicating the groups G1 to Gi and the layers l1 to li determined by the estimator 113.

The estimation apparatus 100 according to the present embodiment has been described above. The estimation apparatus 100 described in the present embodiment is an example, and various modifications can be implemented and executed. For example, the modification described in the first embodiment is also applicable to the present embodiment. Hereinafter, modifications of the communication system 300' including the estimation apparatus 100 will be described.

(Fourth Modification)

Figure 33:
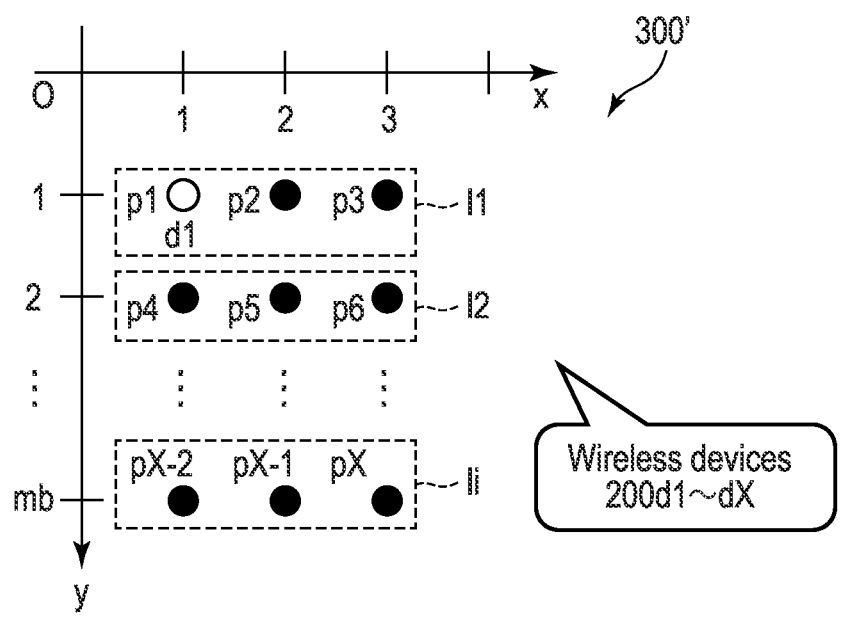
FIG. 33 is a diagram illustrating known information in which the wireless device 200$d$1 is located in a position candidate p1.

In this modification, the accuracy of estimation of the positions of the wireless devices 200 is improved, and the amount of calculation for the estimation is reduced. The acquirer 101 further acquires information indicating the position of at least one wireless device 200 among the wireless devices 200*d*1 to 200*d*X (hereinafter, also referred to as known information). FIG. 33 is a diagram illustrating the known information in which the wireless device 200*d*1 is located in the position candidate p1 as an example of the present modification. The estimator 113 estimates the positions at which the wireless devices 200*d*2 to 200*d*X are located from the position candidates p2 to pX further based on the known information. In this way, when the wireless devices 200*d*1 to 200*d*X are arranged regularly, cases of arrangement of point symmetry or rotational symmetry can be eliminated, and thus the accuracy of estimation of the positions of the wireless devices 200 can be improved and the amount of computation for the estimation can be reduced. This modification can also be applied to the first embodiment.

The modification of the communication system 300' including the estimation apparatus 100 has been described above. The estimation apparatus 100 according to the present embodiment can improve the accuracy of position estimation of the wireless devices 200 by using communication information between the wireless devices 200 using a plurality of propagation paths even in an example in which the wireless devices 200*d*1 to 200*d*X are located on a shelf (shelfs) formed by the housing case 301 and the shield 302.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a processor configured to narrow down positions where wireless devices communicating with each other are located from position candidates of the wireless devices based on (i) position candidate information indicating the position candidates of the wireless devices, (ii) first to N-th received power information related to received power in communication using first to N-th propagation paths between the wireless devices, where N is an integer of 3 or more, and (iii) wireless device identification information of the wireless devices,
wherein a number of the wireless devices is 4 or more.

2. The electronic apparatus according to claim 1, wherein the processor is configured to:
assume a first arrangement and a second arrangement where the wireless devices are located from the position candidates based on the position candidate information, generate a first distribution of received power in the first arrangement and a second distribution of received power in the second arrangement based on from the first to N-th received power information, and narrow down the positions where the wireless devices are located from the position candidates based on the first distribution and the second distribution.

3. The electronic apparatus according to claim 2, wherein the processor is configured to:

calculate a first fittability between the first distribution and a first predetermined distribution and calculate a second fittability between the second distribution and a second predetermined distribution, and estimate an arrangement of the wireless devices in a distribution having a higher fittability in the first fittability and the second fittability as the positions where the wireless devices are located.

4. The electronic apparatus according to claim 2, wherein the processor is configured to:

generate, based on the first to N-th received power information, a first sub-distribution of received power assuming that a distance between the wireless devices is a first distance in the first arrangement, and generate, based on the first to N-th received power information and the first sub-distribution, a second sub-distribution of received power assuming that a distance between the wireless devices is a second distance in the first arrangement, and wherein the first distribution includes the first sub-distribution and the second sub-distribution.

5. The electronic apparatus according to claim 4, wherein the processor is configured to:

calculate a first mode value of a first predetermined distribution fitting the first sub-distribution, calculate a second mode value of a second predetermined distribution fitting a distribution of received power assuming that a distance between the wireless devices is a second distance in the first arrangement, the distribution being generated based on the first to N-th received power information, correct the first to N-th received power information used to generate the first sub-distribution based on a difference between the first mode value and the second mode value, and generate the second sub-distribution based on the first to N-th received power information and the corrected first to N-th received power information.

6. The electronic apparatus according to claim 1, wherein the processor is configured to:

assume first to n-th arrangements where the wireless devices are located from the position candidates based on the position candidate information, where n is an integer equal to or greater than 2, generate first to n-th distributions of received power in the first to n-th arrangements based on the first to N-th received power information, calculate first to n-th fittabilities between the first to n-th distributions and first to n-th predetermined distributions, and estimate an arrangement of the wireless devices in a distribution having a highest fittability among the first to n-th fittabilities as the positions where the wireless devices are located.

7. The electronic apparatus according to claim 1, wherein the first propagation path to the N-th propagation path differ in at least one of:

a time period in which communication is performed between the wireless devices, an airflow between the wireless devices, whether a fan for stirring the airflow between the wireless devices is driven, a frequency band used in communication between the wireless devices, a polarized wave used in communication between the wireless devices, an antenna used in communication between the wireless devices, presence or absence of vibration generated in the wireless devices which communicate, a level of the vibration, or directivity of a signal in communication between the wireless devices.

8. The electronic apparatus according to claim 1, further comprising a storage to hold the first to N-th received power information, wherein the processor is configured to cause the storage to hold the first to N-th received power information.

9. The electronic apparatus according to claim 1, further comprising an outputter configured to output information indicating the position where the wireless device is located.

10. An electronic system comprising:

an electronic apparatus including a processor configured to narrow down positions where wireless devices communicating with each other are located from position candidates of the wireless devices based on (i) position candidate information indicating the position candidates of the wireless devices, (ii) first to N-th received power information related to received power in communication using first to N-th propagation paths between the wireless devices, where N is an integer of 3 or more, and (iii) wireless device identification information of the wireless devices; and the wireless devices, wherein a number of the wireless devices is 4 or more.

11. The electronic system according to claim 10, further comprising:

a housing case; and a shield provided between the wireless devices in the housing case, wherein the wireless devices are inside the housing case, and at least two of the wireless devices communicate with each other via the shield.

12. The electronic system according to claim 11, further comprising a fan generating an airflow in the housing case, wherein the first propagation path and a second propagation path are determined depending on whether or not the fan is driven.

13. A method comprising:

narrowing down positions where wireless devices communicating with each other are located from position candidates of the wireless devices based on (i) position candidate information indicating the position candidates of the wireless devices, (ii) first to N-th received power information related to received power in communication using first to N-th propagation paths between the wireless devices, where N is an integer of 3 or more, and (iii) wireless device identification information of the wireless devices, wherein a number of the wireless devices is 4 or more.

* * * * *